United States Patent
Nakadai et al.

(10) Patent No.: US 9,691,387 B2
(45) Date of Patent: Jun. 27, 2017

(54) CONVERSATION SUPPORT APPARATUS, CONTROL METHOD OF CONVERSATION SUPPORT APPARATUS, AND PROGRAM FOR CONVERSATION SUPPORT APPARATUS

(71) Applicant: HONDA MOTOR CO., LTD., Tokyo (JP)

(72) Inventors: Kazuhiro Nakadai, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/524,068

(22) Filed: Oct. 27, 2014

(65) Prior Publication Data
US 2015/0154957 A1    Jun. 4, 2015

(30) Foreign Application Priority Data
Nov. 29, 2013  (JP) .................................. 2013-247460

(51) Int. Cl.
| | | |
|---|---|---|
| G10L 15/26 | (2006.01) | |
| G06F 17/27 | (2006.01) | |
| G06F 17/28 | (2006.01) | |
| G10L 21/0272 | (2013.01) | |

(52) U.S. Cl.
CPC ............ *G10L 15/26* (2013.01); *G06F 17/275* (2013.01); *G06F 17/289* (2013.01); *G10L 21/0272* (2013.01)

(58) Field of Classification Search
CPC ................................................ G06F 17/30265
USPC ......................................................... 704/235
See application file for complete search history.

(56) References Cited

U.S. PATENT DOCUMENTS

| | | | | |
|---|---|---|---|---|
| 7,680,287 B2* | 3/2010 | Amada | ................. | G01S 3/8083 381/92 |
| 7,843,486 B1* | 11/2010 | Blair | ..................... | H04M 3/568 348/14.01 |
| 8,681,203 B1* | 3/2014 | Yin | ......................... | H04N 7/15 348/14.08 |

(Continued)

FOREIGN PATENT DOCUMENTS

| | | |
|---|---|---|
| JP | 09-206329 A | 8/1997 |
| JP | 2003-162527 A | 6/2003 |

(Continued)

OTHER PUBLICATIONS

Japan Patent Office, Office Action for corresponding Application No. 2013-247460, May 10, 2016.

(Continued)

*Primary Examiner* — Jakieda Jackson
(74) *Attorney, Agent, or Firm* — Squire Patton Boggs (US) LLP

(57) ABSTRACT

A conversation support apparatus includes: a speech input unit configured to input speech signals of two or more users; a speech recognizing unit configured to recognize the speech signals input from the speech input unit; a display unit configured to display the recognition results of the speech recognizing unit; and an image processing unit configured to set display areas respectively corresponding to the users into an image display area of the display unit.

11 Claims, 21 Drawing Sheets

(56) References Cited

U.S. PATENT DOCUMENTS

| | | | | |
|---|---|---|---|---|
| 2002/0161579 | A1* | 10/2002 | Saindon | G06F 17/28 704/235 |
| 2006/0095268 | A1* | 5/2006 | Yano | G10L 15/22 704/275 |
| 2007/0143103 | A1* | 6/2007 | Asthana | H04M 3/567 704/200 |
| 2009/0018828 | A1* | 1/2009 | Nakadai | G10L 15/20 704/234 |
| 2010/0262419 | A1* | 10/2010 | De Bruijn | G10L 15/1822 704/9 |
| 2010/0283829 | A1* | 11/2010 | De Beer | H04N 7/152 348/14.09 |
| 2011/0161076 | A1* | 6/2011 | Davis | G06F 3/04842 704/231 |
| 2011/0246172 | A1* | 10/2011 | Liberman | G06F 17/289 704/2 |
| 2011/0285807 | A1* | 11/2011 | Feng | G06K 9/00228 348/14.08 |
| 2011/0285808 | A1* | 11/2011 | Feng | H04N 7/142 348/14.09 |
| 2012/0035927 | A1* | 2/2012 | Yamada | G06K 9/00228 704/242 |
| 2012/0053936 | A1* | 3/2012 | Marvit | G10L 15/26 704/235 |
| 2013/0035939 | A1* | 2/2013 | Gilbert | G10L 15/063 704/254 |
| 2013/0147923 | A1* | 6/2013 | Zhou | H04B 3/20 348/47 |
| 2013/0216206 | A1* | 8/2013 | Dubin | H04N 7/155 386/282 |
| 2013/0226850 | A1* | 8/2013 | Hannuksela | G10L 25/48 706/14 |
| 2014/0147816 | A1* | 5/2014 | Ferro | G09B 5/065 434/157 |
| 2014/0163991 | A1* | 6/2014 | Short | G10L 21/0272 704/258 |
| 2014/0337023 | A1* | 11/2014 | McCulloch | G10L 15/26 704/235 |
| 2015/0002611 | A1* | 1/2015 | Thapliyal | H04N 7/15 348/14.08 |

FOREIGN PATENT DOCUMENTS

| | | |
|---|---|---|
| JP | 2005-209000 A | 8/2005 |
| JP | 2007-027990 A | 2/2007 |
| JP | 2012-242814 A | 12/2012 |

OTHER PUBLICATIONS

Japan Patent Office, Decision of Rejection for corresponding Japanese Patent Application No. 2013-247460, Dec. 6, 2016.

\* cited by examiner

FIG. 17

| MICROPHONE ARRAY | SOUND SOURCE LOCALIZATION | SOUND SOURCE SEPARATION | LANGUAGE DETECTION | SPEECH RECOGNITION | TRANSLATION |
|---|---|---|---|---|---|
| ARRAY1, ARRAY2, ARRAY3 | - | - | OPTION | ○ | OPTION |
| ARRAY1, ARRAY2 | ○ | - | OPTION | ○ | OPTION |
| ARRAY1, ARRAY2 | ○ | ○ | OPTION | ○ | OPTION |

CONVERSATION SUPPORT APPARATUS, CONTROL METHOD OF CONVERSATION SUPPORT APPARATUS, AND PROGRAM FOR CONVERSATION SUPPORT APPARATUS

CROSS REFERENCE TO RELATED APPLICATIONS

Priority is claimed on Japanese Patent Application No. 2013-247460, filed on Nov. 29, 2013, the content of which is incorporated herein by reference.

BACKGROUND OF THE INVENTION

Field of the Invention

The present invention relates to a conversation support apparatus, a control method of a conversation support apparatus, and a program for a conversation support apparatus.

Description of Related Art

Japanese Unexamined Patent Application, First Publication No. H9-206329 discloses a listening comprehension assisting apparatus that visually assists hearing by recognizing conversation details in speech and displaying characters. In the listening comprehension assisting apparatus described in Japanese Unexamined Patent Application, First Publication No. H9-206329, a speech recognizing unit recognizes speech collected by a microphone and displays characters corresponding to details recognized on the basis of the speech recognition result on display means. In the listening comprehension assisting apparatus described in Japanese Unexamined Patent Application, First Publication No. H9-206329, a speaker uses a transmitter and a listener uses a receiver. The transmitter includes a microphone, a speech recognition circuit, and a transmitter unit and the transmitter unit transmits character information corresponding to the details recognized on the basis of the speech recognition result to the receiver. The receiver includes a receiver unit, a central processing unit (CPU), and a display unit and displays characters on the display unit when character information is received from the transmitter.

SUMMARY OF THE INVENTION

However, in the technique described in Japanese Unexamined Patent Application, First Publication No. H9-206329, it is assumed that each of a speaker and a listener uses the listening comprehension assisting apparatus. Accordingly, when multiple speech pieces are mixed and input to the microphone, it is difficult to recognize the respective speech pieces.

The invention is made in consideration of the above-mentioned problems and an object thereof is to provide a conversation support apparatus, a control method of a conversation support apparatus, and a program for a conversation support apparatus that can recognize multiple speech pieces and support listening comprehension even when the number of speakers is two or more.

(1) In order to achieve the above-mentioned object, according to an aspect of the invention, there is provided a conversation support apparatus including: a speech input unit configured to input speech signals of two or more users; a speech recognizing unit configured to recognize the speech signals input from the speech input unit; a display unit configured to display the recognition results of the speech recognizing unit; and an image processing unit configured to set display areas respectively corresponding to the users into an image display area of the display unit.

(2) In the aspect of the invention, the conversation support apparatus according to (1) may further include a sound source estimating unit configured to estimate sound source directions of the users, and the image processing unit may display the recognition results of the speech recognizing unit in the display areas, which respectively correspond to the users, of the display unit at display angles respectively based on the sound source directions estimated by the sound source estimating unit.

(3) In the aspect of the invention, in the conversation support apparatus according to (2), the image processing unit may display images based on the sound source directions estimated by the sound source estimating unit in the display areas, which respectively correspond to the users, of the display unit.

(4) In the aspect of the invention, the conversation support apparatus according to any one of (1) to (3) may further include a sound source separating unit configured to separate the speech signals input from the speech input unit by the users, and the image processing unit may display the recognition results of the speech signals of the users other than one of the users corresponding to one of the display areas, out of the speech signals by the users separated by the sound source separating unit, in the one display area.

(5) In the aspect of the invention, the conversation support apparatus according to any one of (1) to (4) may further include a position estimating unit configured to estimate positions of the users, and the image processing unit may set or rearrange the display areas respectively corresponding to the users at positions respectively corresponding to the positions of the users estimated by the position estimating unit into the image display area of the display unit.

(6) In the aspect of the invention, in the conversation support apparatus according to (5), the position estimating unit may estimate the positions of the users using the speech signals input from the speech input unit.

(7) In the aspect of the invention, the conversation support apparatus according to any one of (1) to (6) may further include a translation unit configured to translate the recognition results of the speech recognizing unit, and the image processing unit may display the translation results of the translation unit in the display areas, which respectively correspond to the users, of the display unit.

(8) In the aspect of the invention, the conversation support apparatus according to (7) may further include a language information detecting unit configured to detect languages uttered by the users, and the translation unit may translate the recognition results of the speech signals of the users other than one of the users corresponding to one of the display areas into the language of the one user detected by the language information detecting unit.

(9) In the aspect of the invention, the conversation support apparatus according to any one of (1) to (8) may further include a communication unit configured to communicate with another conversation support apparatus, the speech input unit may input a speech signal received by the communication unit from the another conversation support apparatus, and the speech recognizing unit may recognize a speech signal of an user other than the users corresponding to the display areas out of the speech signals input from the speech input unit.

(10) In the aspect of the invention, the conversation support apparatus according to (9) may further include an input unit configured to select a part of an image displayed on the display unit, and the image processing unit may display other recognition candidates corresponding to the selected part of the image on the display unit when the part of the image selected by the input unit is the recognition result displayed on the display unit, may correct the recognition result to the recognition candidate selected by the input unit out of the recognition candidates, and may transmit the corrected recognition result to the another conversation support apparatus through the use of the communication unit.

(11) In order to achieve the above-mentioned object, according to another aspect of the invention, there is provided a control method of a conversation support apparatus, including: a speech input step of causing a speech input unit to input speech signals of two or more users; a speech recognizing step of causing a speech recognizing unit to recognize the speech signals input in the speech input step; and an image processing step of causing an image processing unit to set display areas respectively corresponding to the users into an image display area of a display unit which is configured to display the recognition results of the speech recognizing step.

(12) In order to achieve the above-mentioned object, according to still another aspect of the invention, there is provided a program for a conversation support apparatus causing a computer of the conversation support apparatus to perform: a speech input procedure of inputting speech signals of two or more users; a speech recognizing procedure of recognizing the speech signals input in the speech input procedure; and an image processing procedure of setting display areas respectively corresponding to the users into an image display area of a display unit which is configured to display the recognition results of the speech recognizing procedure.

According to the configuration of (1), (11), or (12), it is possible to recognize speech pieces and to support hearing even when the number of speakers is two or more.

According to the configuration of (2), since a user can easily see the recognition results, it is possible to improve convenience to a user.

According to the configuration of (3), a user can easily distinguish one's own display area.

According to the configuration of (4), it is possible to estimate azimuth by speakers or to separate speech by speakers with high accuracy. Since another speaker can visually confirm the speech of the other speakers on the conversation support apparatus with high accuracy, it is possible to support the hearing of a speaker.

According to the configuration of (5) or (6), since the display position is disposed at the position closest to the corresponding speaker, the speaker can easily see character data (recognition result) obtained by recognizing the speech details of another speaker.

According to the configuration of (7) or (8), since the translation results translated by the translation unit are displayed in the display areas, which correspond to the users, of the display unit (the image display unit 15), another speaker can visually confirm the speech of the other speakers on the conversation support apparatus and it is thus possible to support the hearing of a speaker.

According to the configuration of (9), it is possible to recognize speech using a plurality of conversation support apparatuses.

According to the configuration of (10), it is possible to correctly present speech details of a user to another user.

BRIEF DESCRIPTION OF THE DRAWINGS

FIG. 17 is a diagram showing examples of a combination of units corresponding to microphone arrays according to the second embodiment.

DETAILED DESCRIPTION OF THE INVENTION

First, the basics of the invention will be described below.

In the invention, information indicating speech uttered by a speaker out of speech pieces included in speech signals collected by microphones is displayed in a display area corresponding to that of another person. In the invention, when the number of speakers is two or more, a display area of a display unit is divided into a number of areas corresponding to the number of speakers, each of the speakers are correlated with one of the divided areas, and information indicating speech is displayed in the correlated areas.

Hereinafter, embodiments of the invention will be described with reference to the accompanying drawings.

First Embodiment

Figure 1:
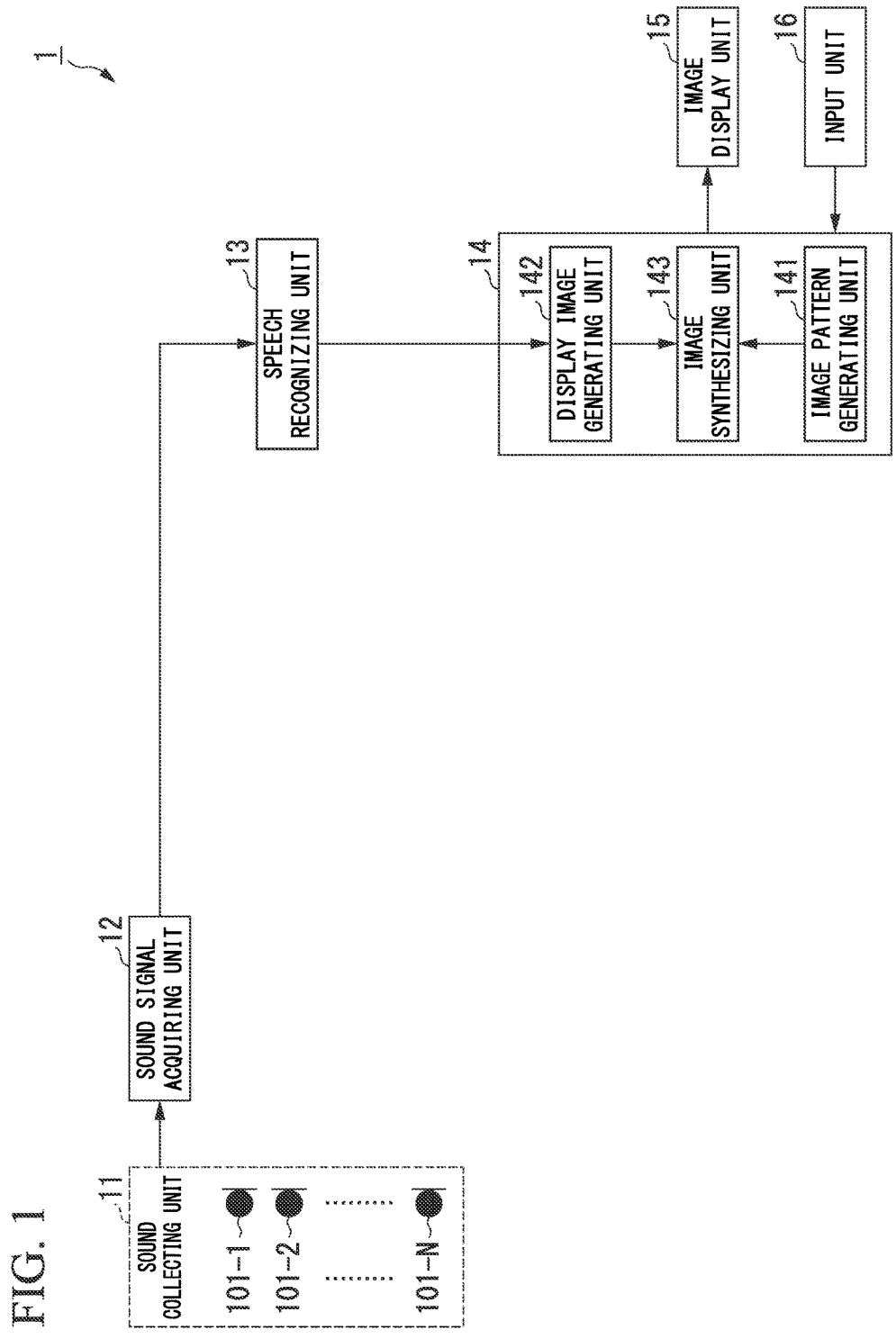
FIG. 1 is a block diagram showing a configuration of a conversation support apparatus according to a first embodiment of the invention.

FIG. 1 is a block diagram showing a conversation support apparatus 1 according to a first embodiment of the invention. As shown in FIG. 1, the conversation support apparatus 1 includes a sound collecting unit 11 (the speech input unit), a sound signal acquiring unit 12 (the speech input unit), a speech recognizing unit 13 (the speech recognizing unit, the position estimating unit), an image processing unit 14, an image display unit 15 (the display unit), and an input unit 16. The image processing unit 14 includes an image pattern generating unit 141, a display image generating unit 142, and an image synthesizing unit 143.

Examples of the conversation support apparatus 1 include a tablet type terminal, a mobile phone, a portable game machine, and a terminal having an image display unit on the surface of a table. In the following embodiments, it is assumed that the conversation support apparatus 1 is a tablet type terminal (hereinafter, also referred to as a tablet terminal).

The input unit 16 is a touch panel sensor disposed on the image display unit 15 and outputs coordinate information on the screen touched by a user to the image processing unit 14. The input unit 16 may be an external input device connected by a wired or wireless connection. Examples of the external input device include a keyboard and a mouse.

The sound collecting unit 11 records sound signals of N (where N is an integer greater than 1, for example, 8) channels and transmits the recorded sound signals of N channels to the sound signal acquiring unit 12. The sound collecting unit 11 includes N microphones 101-1 to 101-N receiving, for example, sound waves having a frequency-band component (for example, 200 Hz to 4 kHz). The sound collecting unit 11 may transmit the recorded sound signals of N channels in a wireless manner or a wired manner. When N is greater than 1, the sound signals only have to be synchronized with each other between the channels at the time of transmission. In the below description, a microphone not specified out of the microphones 101-1 to 101-N is simply referred to as microphone 101. The microphone 101 of the sound collecting unit 11 may be assembled into the conversation support apparatus 1, may be attached to the conversation support apparatus 1, or may be a close-talking microphone used by a speaker, as will be described later.

The sound signal acquiring unit 12 acquires N sound signals recorded by the N microphones 101 of the sound collecting unit 11. The sound signal acquiring unit 12 generates input signals in the frequency domain by performing Fourier transform on the acquired N sound signals in the time domain for each frame. The sound signal acquiring unit 12 outputs the Fourier-transformed N sound signals to the speech recognizing unit 13. The N sound signals may include information for identifying the microphones 101-1 to 101-N or information indicating directions in which the microphones 101-1 to 101-N are disposed. The directions of the microphones 101-1 to 101-N may be acquired by an azimuth sensor (not shown) of the conversation support apparatus 1 and the information indicating the directions in which the microphones 101-1 to 101-N are disposed may be estimated on the basis of information based on the acquired azimuth and the positional relationship of the microphones 101 assembled into the conversation support apparatus 1.

The speech recognizing unit 13 recognizes speech details (for example, text indicating a word or a sentence) by performing a speech recognizing process on the sound signals input from the sound signal acquiring unit 12. In case of sound signals from the plurality of speakers, the speech recognizing unit 13 distinguishes the speakers and recognizes the speech details for each distinguished speaker. For example, the speech recognizing unit 13 may estimate the direction of the microphone 101, from which a sound signal having the highest signal level is acquired out of the sound signals of N channels input from the sound signal acquiring unit 12, to be the direction of the speaker, for example, using a multiple signal classification (MUSIC) method. The speech recognizing unit 13 outputs information indicating the speaker, information indicating the direction of the speaker, and recognition data to the image processing unit 14.

The speech recognizing unit 13 includes, for example, a hidden Markov model (HMM) as an acoustic model, and a word dictionary.

The speech recognizing unit 13 calculates, for example, a sound feature quantity of a sound signal for each predetermined time interval (for example 10 ms). The sound feature quantity is, for example, a characteristic vector which is a set of 34-dimensional Mel-frequency cepstral coefficients (MFCC), a static Mel-scale log spectrum (static MSLS), a delta MSLS, and single delta power, a set of a static Mel-scale log spectrum (static MSLS), a delta MSLS, and single delta power, or the like. The speech recognizing unit 13 determines phonemes from the calculated sound feature quantity using an acoustic model, and recognizes a word from a phoneme sequence including the determined phonemes using a word dictionary.

The conversation support apparatus 1 according to this embodiment is an apparatus supporting hearing and thus a speaker as a user has difficulty in understanding speech of the other speakers. Accordingly, for example, when the number of speakers is two and a first speaker Sp1 speaks, character data based on the speech of the first speaker Sp1 is displayed on the image display unit 15. Then, a second speaker Sp2 utters a response to the character data displayed on the image display unit 15. Thereafter, the first speaker Sp1 utters a response to the character data displayed on the image display unit 15. In this way, when two speakers do not utter speech at the same time, what speaker utters speech can be distinguished from the sound signal of the microphone 101 having the largest feature value or the highest signal level of the sound signal and the speech details can be recognized without performing a sound localization process or a sound separation process on the sound signals input from the sound signal acquiring unit 12 as shown in FIG. 1.

The image pattern generating unit 141 generates a menu image to be described later on the basis of the coordinate information on the screen input from the input unit 16 and outputs the generated menu image to the image synthesizing unit 143. The image pattern generating unit 141 generates a screen pattern image depending on the details selected by a user on the menu screen on the basis of the coordinate information on the screen input from the input unit 16, and outputs the generated screen pattern image to the image synthesizing unit 143. The screen pattern image is a display image corresponding to the number of speakers as will be described later.

The display image generating unit 142 generates character data corresponding to the recognition data for each speaker input from the speech recognizing unit 13, and outputs the generated character data for each speaker to the image synthesizing unit 143. The display image generating unit 142 generates an image indicating the direction of each speaker on the basis of the information indicating the direction of a speaker, which is input from the speech recognizing unit 13, and outputs the image indicating the direction of each speaker to the image synthesizing unit 143.

The image synthesizing unit 143 displays the menu image generated by the image pattern generating unit 141 on the image display unit 15. The image synthesizing unit 143 synthesizes the image so as to display the character data for each speaker input from the display image generating unit 142 in the display areas other than the speaker uttering the speech in the display image generated by the image pattern generating unit 141. The image synthesizing unit 143 synthesizes the image so as to display the image indicating the direction of each speaker, which is input from the display image generating unit 142, in the display areas of the speakers. The image synthesizing unit 143 displays the synthesized image on the image display unit 15.

The image synthesizing unit 143 may synthesize the image so as to display the character data for each speaker in the display area of the speaker uttering the speech in the display image.

The image output from the image synthesizing unit 143 is displayed on the image display unit 15. The image display unit 15 is, for example, a liquid crystal display device, an organic electroluminescence (EL) display device, or an electronic ink display device.

Figure 2:
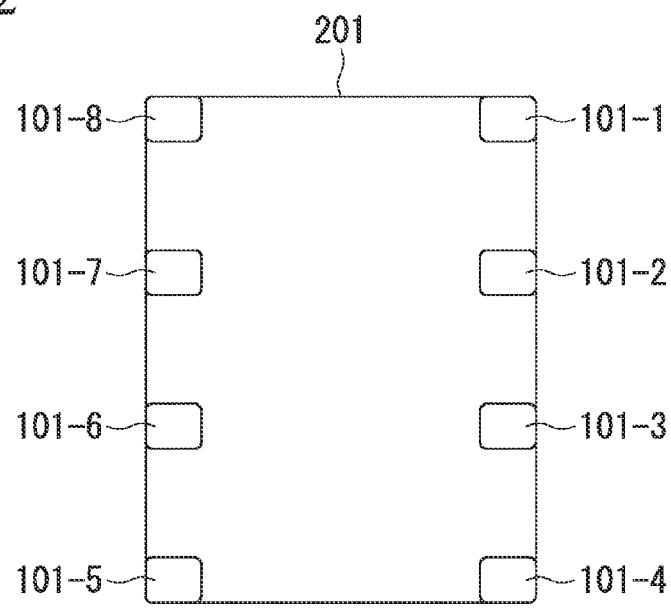
FIG. 2 is a diagram showing an example where microphones are assembled into a main body according to the first embodiment.
Figure 3:
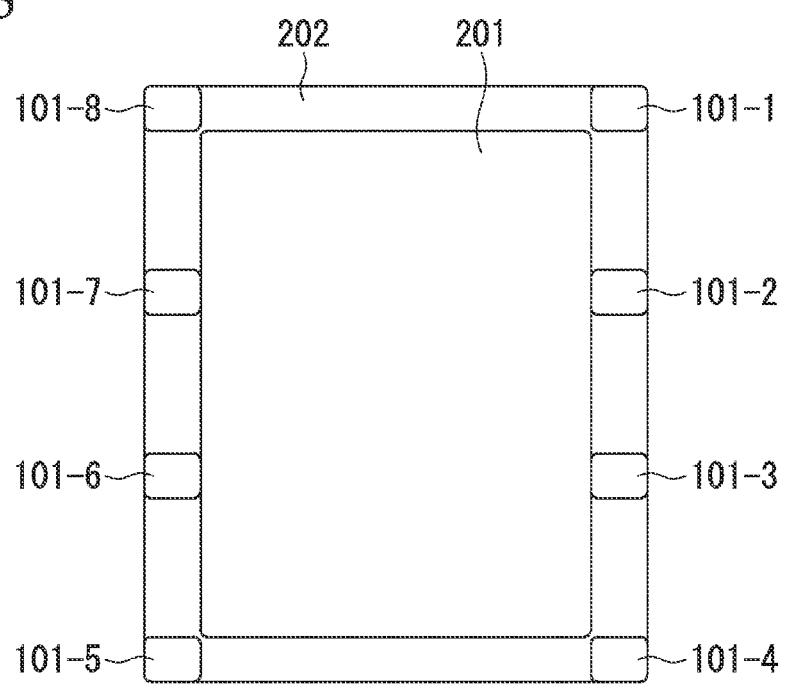
FIG. 3 is a diagram showing an example where microphones are assembled into a cover according to the first embodiment.
Figure 4:
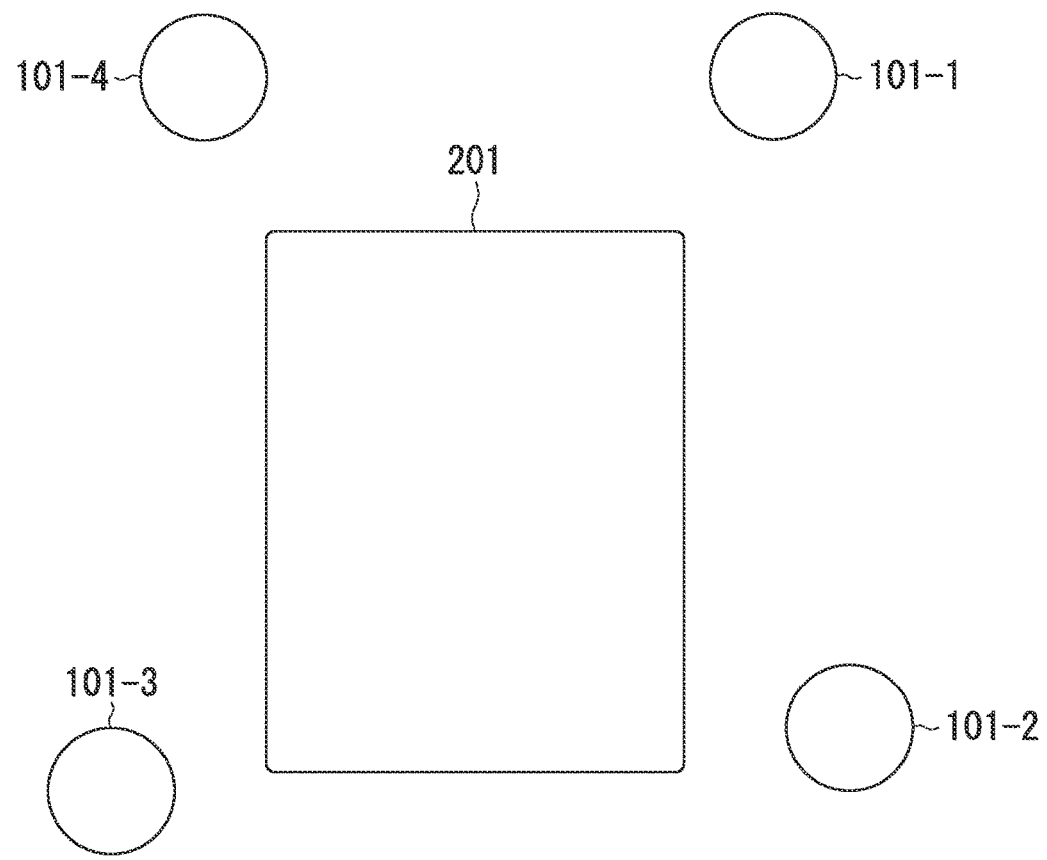
FIG. 4 is a diagram showing an example where speakers use close-talking microphones according to the first embodiment.

The microphones 101 of the sound collecting unit 11 will be described below with reference to FIGS. 2 to 4. FIG. 2 is a diagram showing an example where the microphones 101 are assembled into a main body 201 according to this embodiment. FIG. 3 is a diagram showing an example where the microphones 101 are assembled into a cover 202 according to this embodiment. FIG. 4 is a diagram showing an example where speakers use close-talking microphones according to this embodiment. The number and the arrangement of the microphones 101 shown in FIGS. 2 to 4 are only examples and the invention is not limited thereto. In FIGS. 2 to 4, reference numeral 201 represents the main body of the conversation support device 1. The shape of the main body 201 is not limited to a vertically-long rectangle, but may be a square, a horizontally-long rectangle, a circle, an ellipse, or a polygon.

In the example shown in FIG. 2, eight microphones 101 are assembled into the circumferential portion of the main body 201. The microphones 101-1 to 101-4 out of the eight microphones 101 are disposed along the right long side in the drawing, and the other microphones 101-5 to 101-8 are disposed along the left long side in the drawing.

In the example shown in FIG. 3, eight microphones 101 are assembled into the circumferential portion of the cover 202 that is detachable from the main body 201. The microphones 101 and the main body 201 may be connected to each other in a wired or wireless manner. Like in FIG. 2, the microphones 101-1 to 101-4 are disposed along the right long side in the drawing, and the other microphones 101-5 to 101-8 are disposed along the left long side in the drawing. In this example, the microphones 101 are assembled into the cover 202, but the microphones 101 may be assembled into a bumper for protecting the main body 201 or the like in another example.

In the example shown in FIG. 4, four speakers use close-talking microphones 101-1 to 101-4. The microphones 101 and the main body 201 may be connected to each other in a wired or wireless manner. The positions of the microphones 101 are positions corresponding to the speakers, and it is preferable that the speakers be located on the right and left sides or the upper and lower sides of the main body 201 in the drawing when the number of speakers is two. When the number of speakers is four, it is preferable that the speakers be located on the upper-right side, the lower-right side, the lower-left side, and the upper-left side of the main body 201 in the drawing as shown in FIG. 4.

Figure 5:
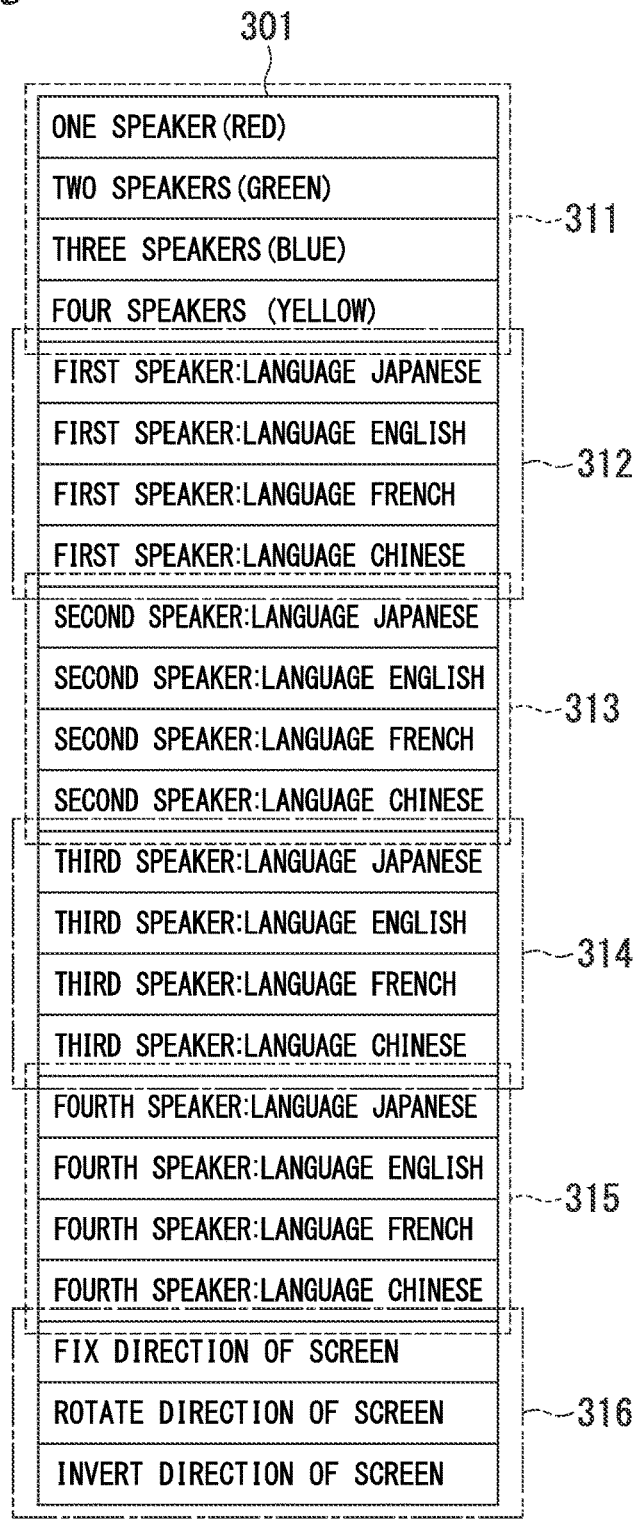
FIG. 5 is a diagram showing an example of a menu image according to the first embodiment.

The menu screen selected by the input unit 16 will be described below. FIG. 5 is a diagram showing an example of a menu image 301 according to this embodiment.

In FIG. 5, the menu image 301 is displayed on the image display unit 15 when a user selects or switches a display screen. The menu image 301 includes a speaker-selecting menu area 311, a language-selecting menu areas 312 to 315 for selecting languages uttered by first to fourth speakers, respectively, and a screen rotation-selecting menu area 316. The menu image 301 shown in FIG. 5 is only an example, and all menu images may be displayed as one menu as shown in FIG. 5 or may be divided and displayed as a plurality of menu images for each item.

The speaker-selecting menu area 311 is selected depending on the number of speakers participating in the conversation using the conversation support apparatus 1 by allowing any one speaker to operate the input unit 16. In the speaker-selecting menu area 311, for example, "two speakers (green)" represents that the number of speakers is two and a display color corresponding to the second speaker is green. In the example shown in FIG. 5, the display colors corresponding to the first to fourth speakers are fixed, but the display colors may be selected within a range in which the display colors can be visually distinguished so that the speakers are not displayed in the same tone. In this case, for example, the first speaker may operate "one speaker (red)" through the use of the input unit 16 to change the display color. For example, after a red color is selected by the first speaker, the image pattern generating unit 141 may display a color, from which the red color can be visually distinguished, in the speaker-selecting menu area 311 corresponding to the other speakers.

In the language-selecting menu area 312 for the language uttered by the first speaker, a menu image for selecting the language used by the first speaker by operating the input unit 16 is displayed. Similarly, in the language-selecting menu areas 313 to 315 for the languages uttered by the second to fourth speakers, menu images for selecting the languages used by the second to fourth speakers by operating the input unit 16 are displayed. In the example shown in FIG. 5, a language used by a speaker is selected from four languages of Japanese, English, French, and Chinese, but the number of languages is not limited to this example. In the example shown in FIG. 5, the speaker-selecting menu area 311 and the language-selecting menu areas 312 to 315 for the languages uttered by the first to fourth speakers are displayed in Japanese, but the invention is not limited to this example. For example, "first speaker: language Japanese" in the language-selecting menu area 312 for the language uttered by the first speaker may be displayed in Japanese, "first speaker: language English" may be displayed in English, "first speaker: language French" may be displayed in French, and "first speaker: language Chinese" may be displayed in Chinese.

The screen rotation-selecting menu area 316 includes an instruction to fix the image displayed on the screen so as not to rotate, an instruction to rotate the direction of the screen by 90 degrees, and an instruction to invert (rotate by 180 degrees) the direction of the screen. The instruction to fix the image displayed on the screen so as not to rotate is, for example, an instruction to fix the display screen so as not to rotate even when a function of rotating the direction of the screen depending on the detection output of a sensor, which is disposed in the conversation support apparatus 1, for detecting the rotation of the main body is provided. The instruction to rotate the direction of the screen by 90 degrees and the instruction to invert (rotate by 180 degrees) the direction of the screen are instructions the display direction of an image so that a speaker can easily see the image displayed on the image display unit 15, depending on the number of speakers or the arrangement thereof.

For example, when a projector not shown is connected to the conversation support apparatus 1, the image displayed on the image display unit 15 is displayed on a screen through the projector. In this case, when the conversation support apparatus 1 rotates, the image displayed on the screen also rotates and thus a speaker may have difficulty in understanding the display area thereof. In order to prevent this problem, the image displayed on the screen is fixed so as not to rotate.

Figure 6:
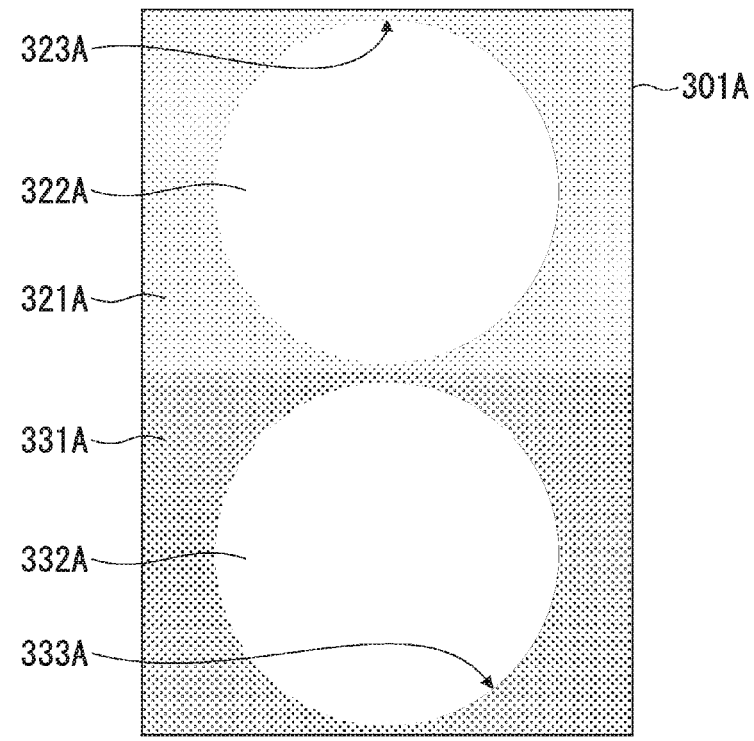
FIG. 6 is a diagram showing an example of a screen pattern image which is displayed on an image display unit when the number of speakers is two according to the first embodiment.
Figure 7:
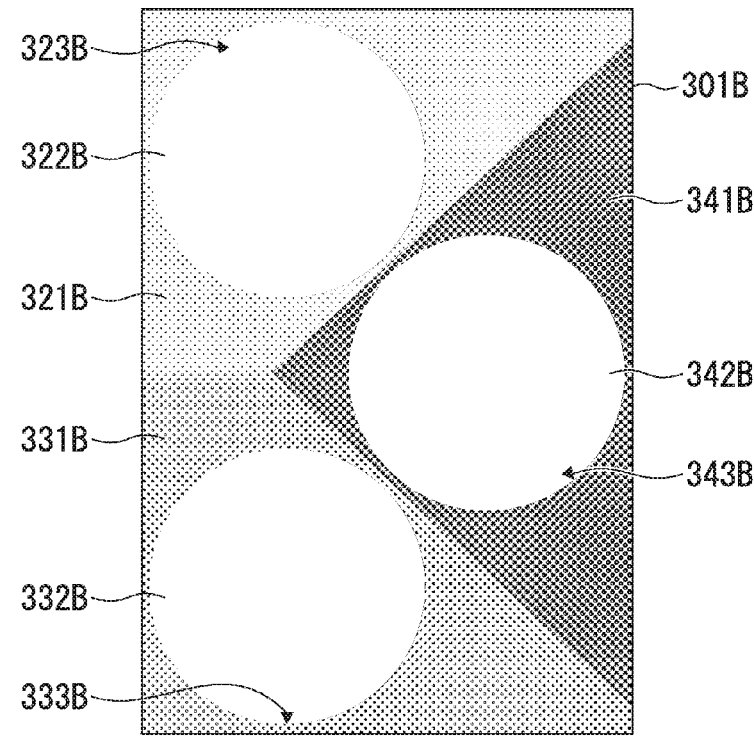
FIG. 7 is a diagram showing an example of a screen pattern image which is displayed on an image display unit when the number of speakers is three according to the first embodiment.

Examples of the screen pattern image generated by the image pattern generating unit 141 will be described below with reference to FIGS. 6 to 8. FIG. 6 is a diagram showing an example of a screen pattern image displayed on the image display unit 15 when the number of speakers is two according to this embodiment. FIG. 7 is a diagram showing an example of a screen pattern image displayed on the image display unit 15 when the number of speakers is three according to this embodiment.

Figure 8:
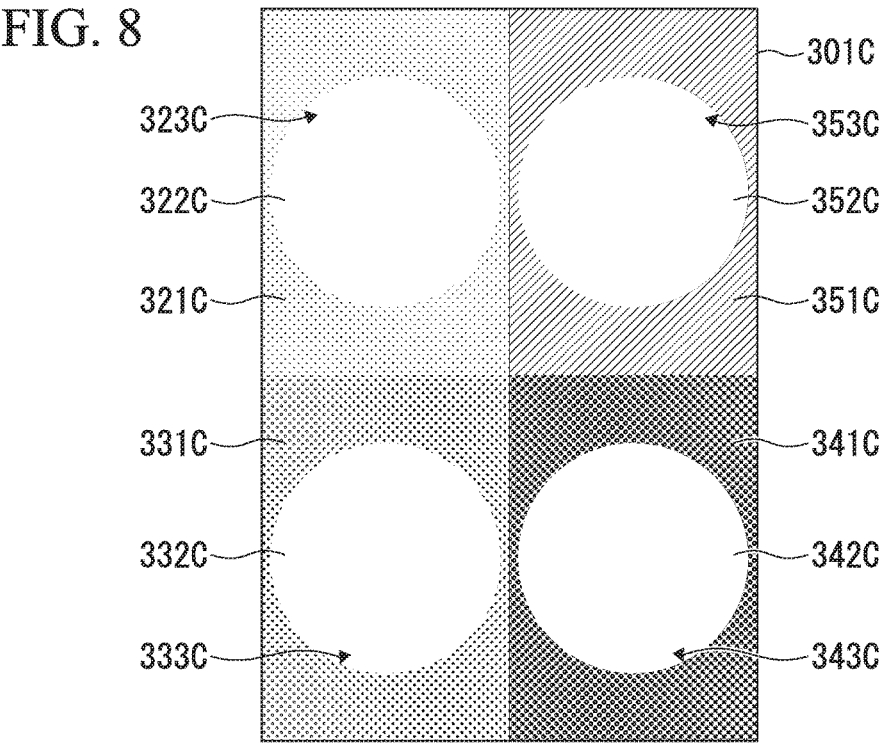
FIG. 8 is a diagram showing an example of a screen pattern image which is displayed on an image display unit when the number of speakers is four according to the first embodiment.

FIG. 8 is a diagram showing an example of a screen pattern image displayed on the image display unit 15 when the number of speakers is four according to this embodiment. The arrangements and the color combinations shown in FIGS. 6 to 8 are only examples and the invention is not limited to these examples. In FIGS. 6 to 8, images 301A to 301C are screen pattern images displayed on the image display unit 15. Regarding the colors corresponding to the speakers, the first speaker is shown in red, the second speaker is shown in green, the third speaker is shown in blue, and the fourth speaker is shown in yellow, as in the menu image shown in FIG. 5.

In the following examples, the display areas corresponding to the speakers are distinguished with different colors, but the invention is not limited thereto. The display areas corresponding to the speakers may be distinguished, for example, with different patterns, icons corresponding to the speakers, or avatars as personified images corresponding to the speakers. In this case, since the display areas corresponding to the speakers can be distinguished by the speakers without distinguishing the areas or the like by colors, a monochrome image display device or a monochrome electronic ink display device can be used as the image display unit 15 and it is thus possible to reduce power consumption.

As shown in FIG. 6, when the number of speakers is two, image 301A is partitioned into an upper area and a lower area in the drawing, for example, a display area of information presented to the first speaker is allocated to the upper area, and a display area of information presented to the second speaker is allocated to the lower area.

A first presentation image 321A in the display area of the information presented to the first speaker includes a first character presentation image 322A of a character display area in which a text of speech details uttered by the second speaker is displayed as will be described later. The color of the first character presentation image 322A is, for example, white. The first character presentation image 322A includes an azimuth image 323A indicating the direction of the first speaker as will be described later. In the example shown in FIG. 6, the first speaker is located on the upper-front side in the drawing.

A second presentation image 331A in the display area of the information presented to the second speaker includes a second character presentation image 332A of a character display area in which a text of speech details uttered by the first speaker is displayed and an azimuth image 333A indicating the direction of the second speaker. In the example shown in FIG. 6, the second speaker is located on the lower-right side in the drawing. The color of the second character presentation image 332A is, for example, white.

As shown in FIG. 7, when the number of speakers is three, image 301B is partitioned into three areas, for example, the display area of information presented to the first speaker is allocated to the upper-left area, the display area of information presented to the second speaker is allocated to the lower-left area, and the display area of information presented to the third speaker is allocated to the right area.

First to third presentation images 321B to 341B of the display areas corresponding to the first to third speakers include first to third character presentation images 322B to 342B of the character display areas in which texts of the speech details uttered by the speakers not including the corresponding speaker are displayed and azimuth images 323B to 343B indicating the direction of the corresponding speaker. The colors of the first to third character presentation images 322B to 342B are, for example, white.

For example, texts of the speech details uttered by the first and second speakers are displayed in the third character presentation image 342B of the third presentation image 341B in the display area of the information presented to the third speaker. The azimuth image 343B represents the direction of the third speaker.

As shown in FIG. 8, when the number of speakers is four, image 301C is partitioned into four areas, for example, the display area of information presented to the first speaker is allocated to the upper-left area, and the display area of information presented to the second speaker is allocated to the lower-left area. The display area of information presented to the third speaker is allocated to the lower-right area and the display area of information presented to the fourth speaker is allocated to the upper-right area.

First to fourth presentation images 321C to 351C of the display areas corresponding to the first to fourth speakers include first to fourth character presentation images 322C to 352C of the character display areas in which texts of the speech details uttered by the speakers not including the corresponding speaker are displayed and azimuth images 323C to 353C indicating the direction of the corresponding speaker. The colors of the first to fourth character presentation images 322C to 352C are, for example, white.

For example, texts of the speech details uttered by the first to third speakers are displayed in the fourth character presentation image 352C of the fourth presentation image 351C in the display area of the information presented to the fourth speaker. The azimuth image 353C represents the direction of the fourth speaker.

Each speaker may input an initial direction of the corresponding speaker by operating the input unit 16 of a touch panel type disposed on the image display unit 15, for example, in FIG. 8. In this case, the conversation support apparatus 1 may continuously display texts of speech details in a report corresponding to the input initial directions of the speakers.

As shown in FIGS. 6 to 8, the image pattern generating unit 141 partitions each display area so that the sizes of images in the character display areas in which the texts of the speech details uttered by the speakers other than the corresponding speaker are uniform. Alternatively, the image pattern generating unit 141 may detect that the conversation support apparatus is tilted and located on a table or the like on the basis of the detection result of a tilt sensor (not shown) of the conversation support apparatus 1, may compute the ratio of the image sizes in the character display areas on the basis of the detected tilt angle, and may determine the size of each partitioned areas depending on the image sizes in the character display areas based on the computed ratio.

The correspondence between the two to four partitioned areas and the speakers is stored in advance in the image pattern generating unit 141. The image pattern generating unit 141 may switch the correspondence between the areas and the speakers in accordance with an instruction input from the input unit 16. For example, in FIG. 8, when the positions of the second speaker and the fourth speaker are interchanged with each other, for example, the second speaker may operate the input unit 16 of a touch panel type on the image display unit 15 so as to move the second presentation image 331C to the area of the fourth presentation image 351C, whereby the second presentation image 331C and the fourth presentation image 351C are interchanged with each other. Accordingly, even when the positions of the speakers are interchanged, the conversation details displayed on the screen can be maintained and thus the convenience for the speakers is improved.

Figure 9:
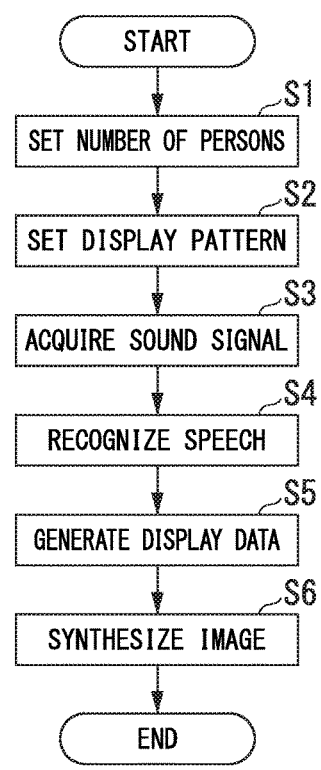
FIG. 9 is a flowchart showing a process flow which is performed by the conversation support apparatus according to the first embodiment.

A process flow which is performed by the conversation support apparatus 1 will be described below. FIG. 9 is a flowchart showing the process flow which is performed by the conversation support apparatus 1 according to this embodiment.

(Step S1) A speaker selects the number of users in the menu image 301 shown in FIG. 5 by operating the input unit 16. Then, each speaker selects a language to be used in the menu image 301 shown in FIG. 5 by operating the input unit 16. Then, the input unit 16 outputs coordinate information on the screen selected by the speaker to the image processing unit 14.

(Step S2) The image pattern generating unit 141 generates a screen pattern image depending on the details selected on the menu screen by the user on the basis of the coordinate information on the screen input from the input unit 16 and outputs the generated screen pattern image to the image synthesizing unit 143. Then, the image synthesizing unit 143 displays the menu image generated by the image pattern generating unit 141 on the image display unit 15.

(Step S3) The sound signal acquiring unit 12 starts acquiring of N sound signals recorded by the N microphones 101 of the sound collecting unit 11, for example, after a recognition start instruction is given by the input unit 16 or at the timing at which the process of step S1 is performed. Then, the sound signal acquiring unit 12 outputs the Fourier-transformed N sound signals to the speech recognizing unit 13.

(Step S4) The speech recognizing unit 13 performs a speech recognizing process by speakers on the sound signals input from the sound signal acquiring unit 12 to recognize speech details. Then, the speech recognizing unit 13 estimates the directions of the speakers, for example, on the basis of the direction of the microphone 101 by which the sound signal having the highest signal level is acquired at the time of utterance of the speakers. Then, the speech recognizing unit 13 outputs information indicating the speakers, information indicating the directions of the speakers, and the recognition data to the image processing unit 14.

(Step S5) The display image generating unit 142 generates character data corresponding to the recognition data for each speaker input from the speech recognizing unit 13 and outputs the generated character data for each speak to the image display unit 15. The display image generating unit 142 generates an image of the information indicating the direction of each speaker on the basis of the information indicating the directions of the speakers, which is input from the speech recognizing unit 13, and outputs the image of the generated information indicating the direction of each speaker to the image synthesizing unit 143.

(Step S6) The image synthesizing unit 143 synthesizes an image so as to display the character data for each speaker, which is input from the display image generating unit 142, in the display areas other than the corresponding speaker on the display image generated by the image pattern generating unit 141. Then, the image synthesizing unit 143 synthesizes an image so as to display the image of the information indicating the direction for each speaker, which is input from the display image generating unit 142, in the display areas of the speakers. Then, the image synthesizing unit 143 displays the synthesized image on the image display unit 15.

Then, the process flow which is performed by the conversation support apparatus 1 ends.

Description of Experiment Result

Figure 10:
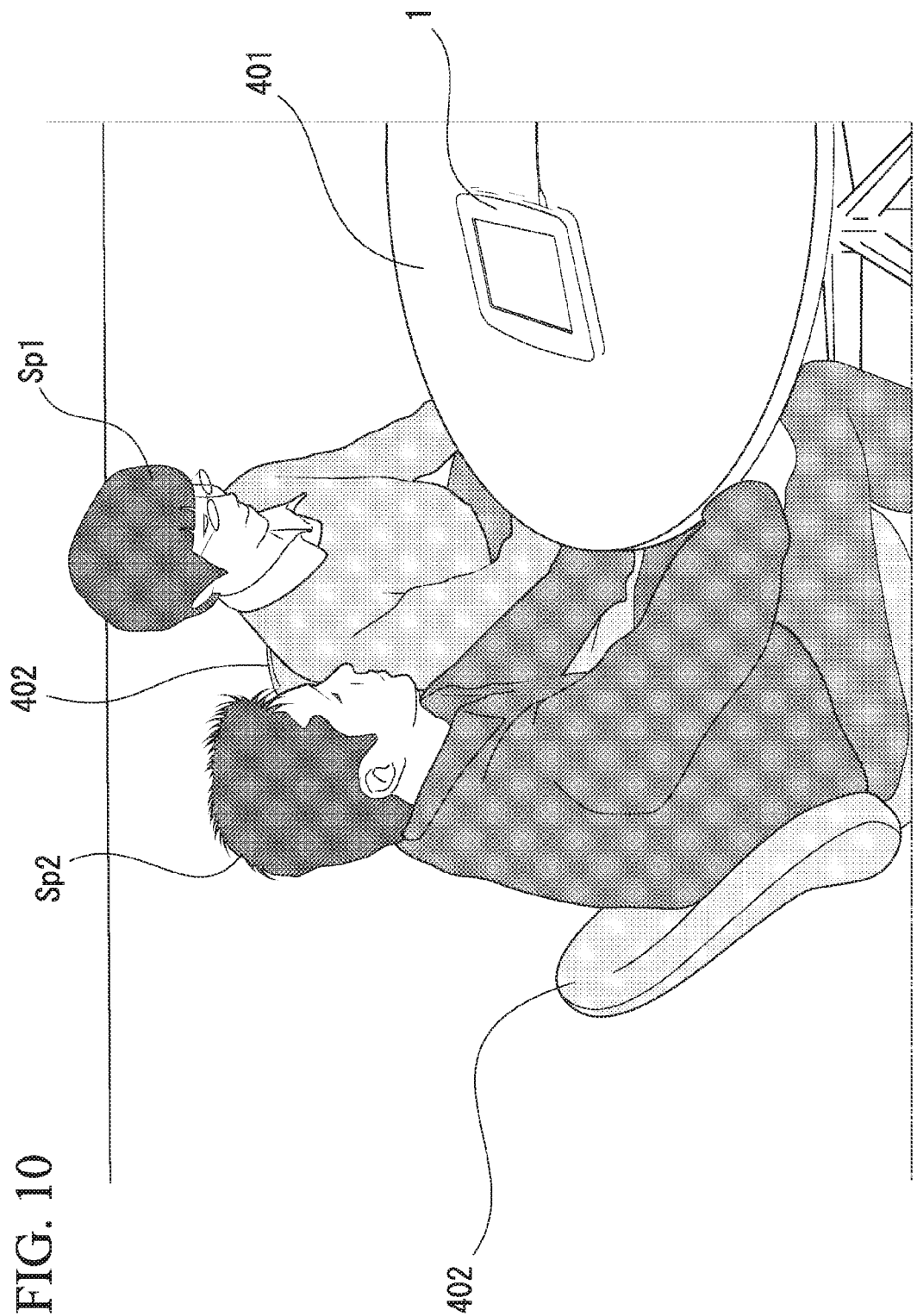
FIG. 10 is a diagram showing an experiment environment.

An example of the result of an experiment which is performed using the conversation support apparatus 1 according to this embodiment will be described below. FIG. 10 is a diagram showing an experiment environment.

As shown in FIG. 10, the conversation support apparatus 1 is tilted and placed on a table 401.

The conversation support apparatus 1 is also placed so that one long side comes in contact with the table 401. The experiment is carried out in a room having a predetermined area. There are two speakers of a first speaker Sp1 and a second speaker Sp2 and the first speaker Sp1 and the second speaker Sp2 sit on chairs 402.

Figure 11:
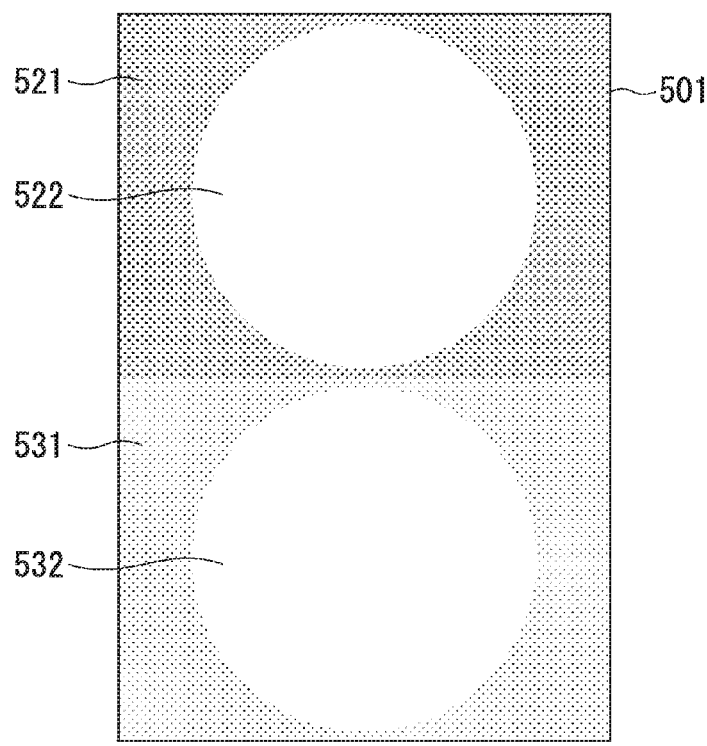
FIG. 11 is a diagram showing an image which is displayed on the image display unit before starting a conversation.

FIG. 11 is a diagram showing an image 501 displayed on the image display unit 15 before starting a conversation. In the image 501, a first presentation image 521 on the upper side in the drawing is an area presented to the first speaker Sp1, and a second presentation image 531 on the lower side in the drawing is an area presented to the second speaker Sp2. On the image display unit 15 of the conversation support apparatus 1 in FIG. 10, the first presentation image 521 is displayed on the left side of the first speaker Sp1 and the second speaker Sp2, and the second presentation image 531 is displayed on the right side. The diagram shown in FIG. 11 shows an image which is displayed on the image display unit 15 after two speakers are selected as the number of speakers by the first speaker Sp1 or the second speaker Sp2 (step S2). The first presentation image 521 includes a first character presentation image 522 and the second presentation image 531 includes a second character presentation image 532.

Figure 12:
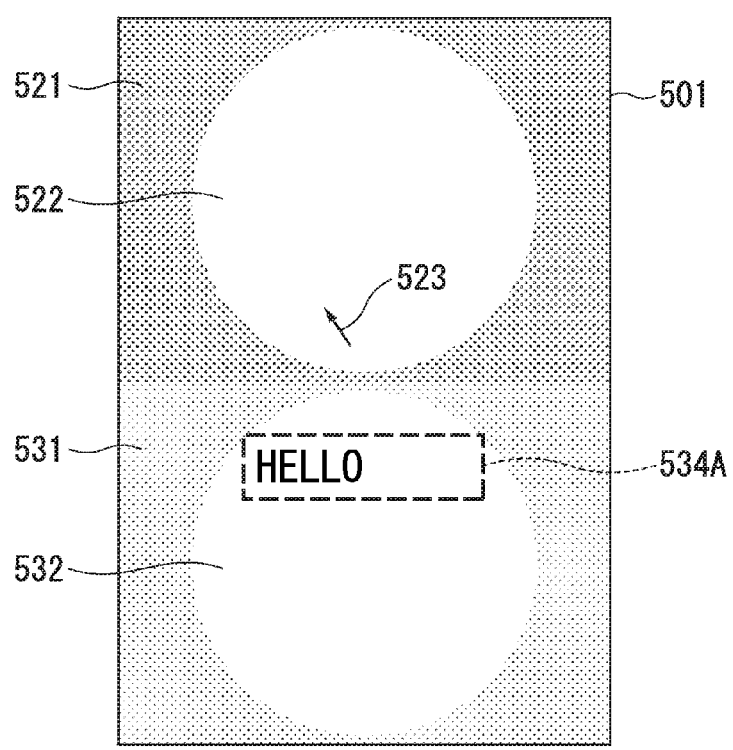
FIG. 12 is a diagram showing an image which is displayed on the image display unit after a first speaker utters "Hello".

FIG. 12 is a diagram showing an image which is displayed on the image display unit 15 after the first speaker Sp1 utters "Hello". As shown in FIG. 12, "Hello" which is an image 534A indicating characters obtained by recognizing the speech of the first speaker Sp1 is displayed on the second character presentation image 532 by the image processing unit 14. At this time, since the second speaker Sp2 does not utter speech, the direction of the second speaker Sp2 is unclear. Accordingly, as shown in FIG. 12, "Hello" as the image 534A is displayed in the initial direction by the image processing unit 14. An azimuth image 523 indicating the direction of the first speaker Sp1 is displayed in the first character presentation image 522 by the image processing unit 14. In the azimuth image 523, the direction of the arrowhead of an arrow is the direction of the first speaker Sp1.

Figure 13:
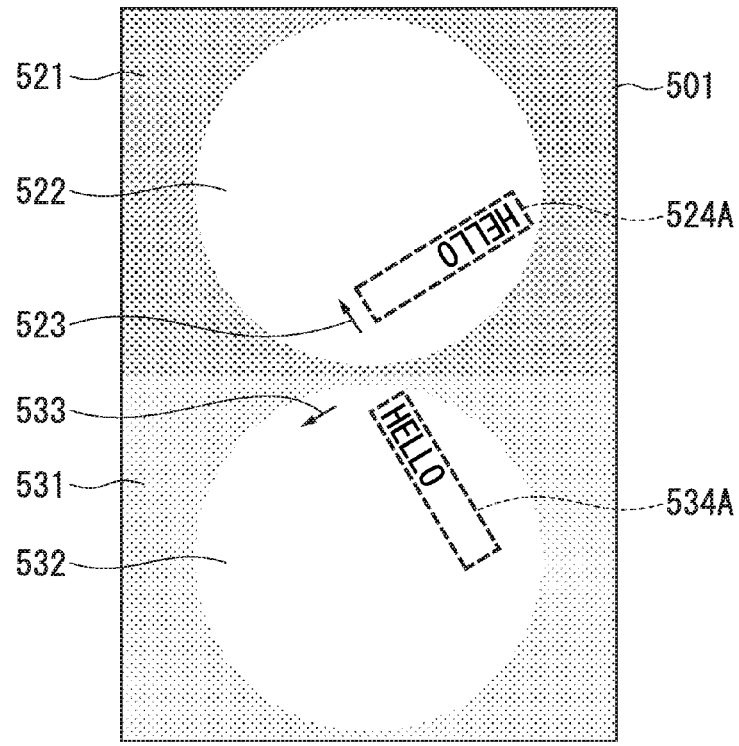
FIG. 13 is a diagram showing an image which is displayed on the image display unit after a second speaker utters "Hello" subsequently to FIG. 12.

FIG. 13 is a diagram showing an image which is displayed on the image display unit 15 after the second speaker Sp2 utters "Hello" subsequently to FIG. 12. At this time, since the second speaker Sp2 utters speech, the speech recognizing unit 13 estimates the direction of the second speaker Sp2. An azimuth image 533 indicating the direction of the second speaker Sp2 is displayed in the second character presentation image 532 by the image processing unit 14. As a result, the image 534A displayed in the second character presentation image 532 is displayed in a state where the display is rotated to correspond to the direction of the second speaker Sp2 by the display image generating unit 142.

"Hello" which is an image 524A indicating the characters obtained by recognizing the speech of the second speaker Sp2 is displayed in the first character presentation image 522 in the direction based on the direction of the first speaker Sp1 by the image processing unit 14.

Figure 14:
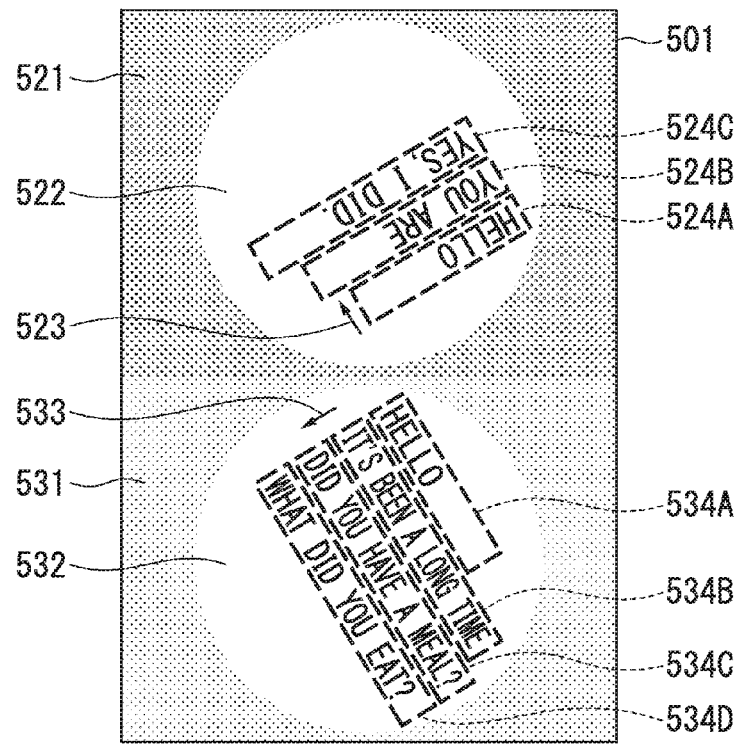
FIG. 14 is a diagram showing an image which is displayed on the image display unit after the first speaker utters speech four times and the second speaker utters speech three times.

FIG. 14 is a diagram showing an image which is displayed on the image display unit 15 after the first speaker Sp1 utters speech four times and the second speaker Sp2 utters speech three times.

The images 524A to 524C of the characters obtained by recognizing the speech of the second speaker Sp2 are displayed in the first character presentation image 522. As shown in FIG. 14, the images 524A to 524C are sequentially displayed from the deep side to the near side of the image display unit 15 in the first speaker Sp1. The images 534A to 534D of the characters obtained by recognizing the speech of the first speaker Sp1 are displayed in the second character presentation image 532. As shown in FIG. 14, the images 534A to 534D are sequentially displayed from the deep side to the near side of the image display unit 15 in the second speaker Sp2. In FIG. 14, the uttering order is, for example as follows, image 534A, image 524A, image 534B, image 524B, image 534C, image 524C, and image 534D.

For example, the display image generating unit 142 may determine whether the first character presentation image 522 is full with the images corresponding to the recognized characters and may delete the image corresponding to the oldest speech or may scroll the image when it is determined that the first character presentation image 522 is full with the images corresponding to the recognized characters. When the first speaker Sp1 desires to see the image corresponding to the deleted speech, the image processing unit 14 may perform processing so that the first speaker Sp1 refers to the previous speech by operating the input unit 16 of a touch panel type disposed on the image display unit 15 so as to call the image of the character previously displayed in the first character presentation image 522 on the image display unit 15.

In the examples shown in FIGS. 12 to 14, the sizes of the images displayed in the first character presentation image 522 are equal to, but the invention is not limited to this example. For example, an image obtained by recognizing the newest speech is displayed to be large at the center of the first character presentation image 522 and an image based on the previous speech may be displayed to be small. The same is true of an image which is displayed in the second character presentation image 532.

In FIGS. 12 to 14, the display image generating unit 142 the may determine character size so that the characters corresponding to each speech is included in one line. Alternatively, the display image generating unit 142 may display an image corresponding to the recognized characters over several lines with a predetermined character size. In this case, the speech recognizing unit 13 may output the recognized recognition data, which includes information indicating clauses, to the image processing unit 14. Accordingly, when it is determined that the recognized sentence is not included in one line, the display image generating unit 142 may return to the head of a next line at the position of a clause break in the sentence using the information indicating clauses, which is input from the speech recognizing unit 13.

For example, in FIG. 14, the images 524A to 524C corresponding to the recognized characters may be displayed with the color corresponding to the second speaker Sp2. Similarly, the images 534A to 534D corresponding to the recognized characters may be displayed with the color corresponding to the first speaker Sp1.

Figure 15:
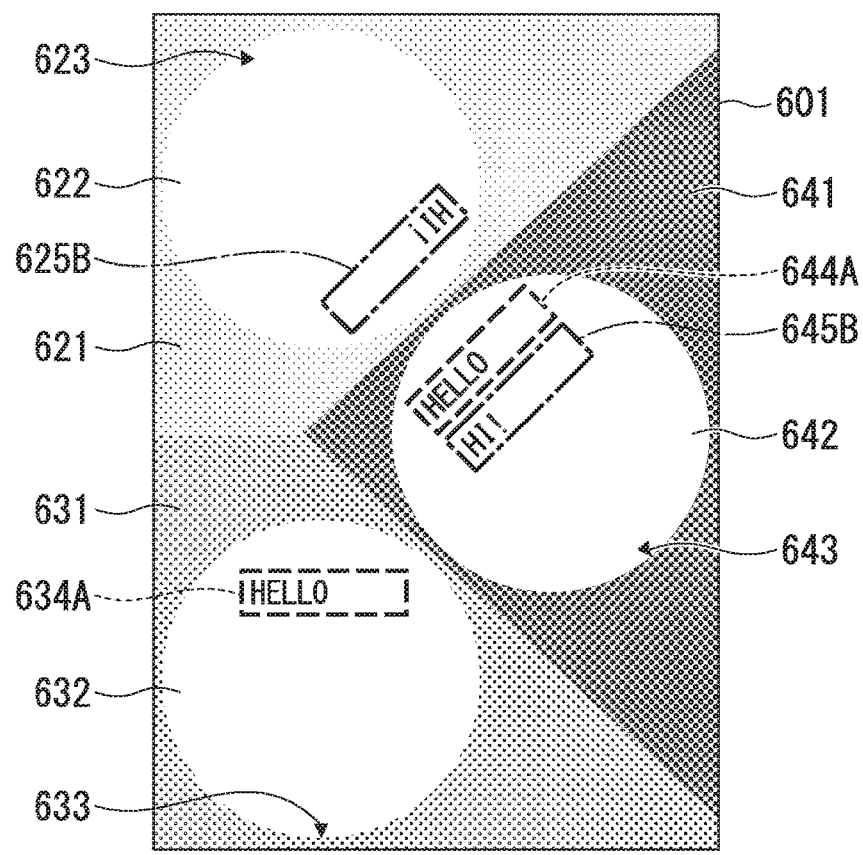
FIG. 15 is a diagram showing an example of an image which is displayed on the image display unit when the number of speakers is three.

An example of an image which is displayed on the image display unit 15 when the number of speakers is three will be described below. FIG. 15 is a diagram showing an example of an image 601 which is displayed on the image display unit 15 when the number of speakers is three.

The image 601 corresponds to image 301B shown in FIG. 7, and reference numerals 621, 622, 623, 631, 632, 633, 641, 642, and 643 correspond to reference numerals 321B, 322B, 323B, 331B, 332B, 333B, 341B, 342B, and 343B in FIG. 7, respectively.

In the example shown in FIG. 15, first, the first speaker utters speech of "Hello". Accordingly, an image 634A corresponding to the recognized characters is displayed in a second character presentation image 632 and an image 644A corresponding to the recognized characters is displayed in a third character presentation image 642. The image 634A and the image 644A may be displayed with a color corresponding to the first speaker, for example, red. Information indicating that the first speaker utters speech may be added to the image 634A and the image 644A by the display image generating unit 142. Examples of the information indicating that the first speaker utters speech include a name, an avatar corresponding to the first speaker, an icon corresponding to the first speaker, and a mark (for example, red circle) corresponding to the first speaker. Accordingly, it is possible to support visual recognition which the utterance result by the speaker is recognized.

Then, the second speaker utters speech of "Hi!". Accordingly, an image 625B corresponding to the recognized characters is displayed in the first character presentation image 622 and an image 645B corresponding to the recognized characters is displayed in the third character presentation image 642. In this case, the image 625B and the image 645B may be displayed with the color corresponding to the second speaker, for example, green.

As described above, the conversation support apparatus 1 according to this embodiment includes the speech input unit (the sound collecting unit 11, the sound signal acquiring unit 12) configured to input speech signals of two or more users, the speech recognizing unit 13 configured to recognize the speech signals input from the speech input unit, the display unit (the image display unit 15) configured to display the recognition results of the speech recognizing unit, and the image processing unit 14 configured to set the display areas respectively corresponding to the users into the image display area (321A, 322A, 331A, 332A, 321B, 322B, 331B, 332B, 341B, 342B, 321C, 322C, 331C, 332C, 341C, 342C, 351C, 352C) of the display unit (the image display unit 15).

According to this configuration, the conversation support apparatus 1 according to this embodiment can recognize speech pieces and support hearing even when the number of speakers is two or more. Since the sound localization process or the sound separation process is not performed on the sound signals acquired by the sound signal acquiring unit 12, it is possible to reduce the computational load of the apparatus and to reduce the number of functional units of the apparatus.

The conversation support apparatus 1 according to this embodiment includes the sound source estimating unit (the sound signal acquiring unit 12) configured to estimate the sound source directions of the users, and the image processing unit 14 displays the recognition results of the speech recognizing unit in the display areas, which respectively correspond to the users, of the image display unit 15 at the display angles respectively based on the sound source directions estimated by the sound source estimating unit.

According to this configuration, the conversation support apparatus 1 according to this embodiment can display the character data in the angles corresponding to the directions of the speakers as shown in FIGS. 13 to 15. As a result, in the conversation support apparatus 1 according to this embodiment, since a user can easily see the recognized result, it is possible to improve convenience for the user.

In the conversation support apparatus 1 according to this embodiment, the image processing unit 14 displays images based on the sound source directions estimated by the sound source estimating unit (the sound signal acquiring unit 12) in the display areas, which respectively correspond to the users, of the image display unit 15.

According to this configuration, in the conversation support apparatus 1 according to this embodiment, since the images 523, 533, 623, 633, and 643 indicating the directions of the speakers can be displayed on the image display unit 15 as shown in FIGS. 13 to 15, a user can easily distinguish the corresponding display area.

In this embodiment, for example, the display areas corresponding to the number of speakers selected from the menu are displayed as shown in FIG. 8 when the number of speakers is four, but the invention is not limited to this example. The conversation support apparatus 1 registers speech pieces of the four speakers (the first to fourth speakers Sp1 to Sp4), for example, before starting a conversation. Then, when four speakers are located at predetermined positions and then the four speakers sequentially utter speech, the speech recognizing unit 13 of the conversation support apparatus 1 estimates the positions of the speakers using the uttered speech. The image processing unit 14 may determine or rearrange the image display positions on the basis of the positions of the speakers estimated by the speech recognizing unit 13.

For example, it is assumed that four speakers (the first to fourth speakers Sp1 to Sp4) are located at the same positions as shown in FIG. 4. Here, it is assumed that the first to fourth speakers Sp1 to Sp4 use the microphones 101-1 to 101-4.

The speech recognizing unit 13 recognizes speech pieces sequentially uttered by the speakers, arranges the display area of the first speaker Sp1 on the upper-right side of the fourth presentation image 351C in FIG. 8, arranges the display area of the second speaker Sp2 on the lower-right side of the third presentation image 341C in FIG. 8, arranges the display area of the third speaker Sp3 on the lower-left side of the second presentation image 331C in FIG. 8, arranges the display area of the fourth speaker Sp4 on the upper-left side of the first presentation image 321C in FIG. 8. In this way, when the plurality of speakers do not utter speech at the same time and small noise is present in the environment in which the conversation support apparatus 1 is used, the above-mentioned processes can be performed without performing the sound source localization process or the sound source separation process like the conversation support apparatus 1 according to this embodiment.

As described above, the conversation support apparatus 1 according to this embodiment includes the position estimating unit (the speech recognizing unit 13) configured to estimate the positions of the users, and the image processing unit 14 sets or rearranges the display areas respectively corresponding to the users at positions respectively corresponding to the positions of the users estimated by the position estimating unit into the image display area of the display unit.

According to this configuration, in the conversation support apparatus 1 according to this embodiment, since the display position is disposed at the position closest to the corresponding speaker, the speaker can easily see character data (recognition result) obtained by recognizing the speech details of another speaker.

Second Embodiment

Figure 16:
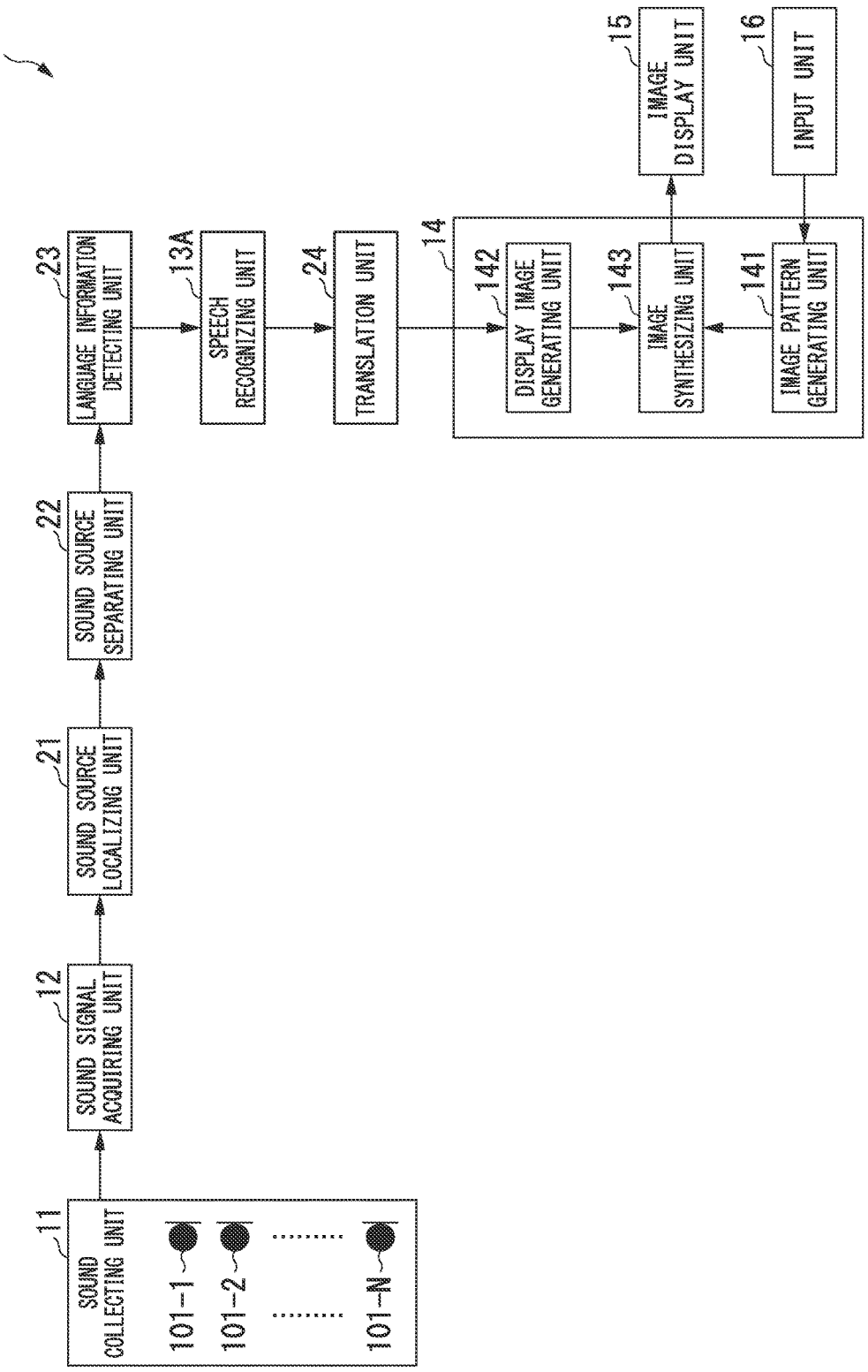
FIG. 16 is a block diagram showing a configuration of a conversation support apparatus according to a second embodiment of the invention.

FIG. 16 is a block diagram showing a conversation support apparatus 1A according to a second embodiment of the invention. As shown in FIG. 16, the conversation support apparatus 1A includes a sound collecting unit 11, a sound signal acquiring unit 12, a speech recognizing unit 13A, an image processing unit 14, an image display unit 15, an input unit 16, a sound source localizing unit 21 (the sound source estimating unit), a sound source separating unit 22, a language information detecting unit 23, and a translation unit 24. The image processing unit 14 includes an image pattern generating unit 141, a display image generating unit 142, and an image synthesizing unit 143.

The functional units having the same functions as in the conversation support apparatus 1 described with reference to FIG. 1 will be referenced with the same reference numerals and a description thereof will not be repeated.

The sound source localizing unit 21 estimates an azimuth of a sound source on the basis of an input signal input from the sound signal acquiring unit 12 and outputs azimuth information indicating the estimated azimuth and sound signals of N channels to the sound source separating unit 22. The azimuth estimated by the sound source localizing unit 21 is, for example, a direction in the horizontal plane with respect to the direction of a predetermined microphone out of the N microphones from the point of the center of gravity of the positions of the N microphones of the sound collecting unit 11. For example, the sound source localizing unit 21 estimates the azimuth using a generalized singular-value decomposition-multiple signal classification (GSVD-MUSIC) method.

Other sound source direction estimation methods such as a weighted delay and sum beam forming (WDS-BF) method and a MUSIC method may be used to estimate the azimuth.

The sound source separating unit 22 acquires the sound signals of N channels output from the sound source localizing unit 21 and separates the acquired sound signals of N channels into sound signals by speakers, for example, using a geometric high-order decorrelation-based source separation (GHDSS) method. The GHDSS method will be described later. Alternatively, the sound source separating unit 22 may perform the sound source separation process, for example, using an independent component analysis (ICA) method. The sound source separating unit 22 outputs the separated sound signals by speakers and the azimuth information input from the sound source localizing unit 21 to the language information detecting unit 23.

The sound source separating unit 22 may separate the sound signals from the speakers into the sound signals by speakers after noise and the sound signals of the speakers are separated from each other, for example, using a room transfer function stored therein. For example, the sound source separating unit 22 may calculate a sound feature quantity for each sound signal of N channels and may separate the sound signals into the sound signals by speakers on the basis of the calculated sound feature quantity and the azimuth information input from the sound source localizing unit 21.

The language information detecting unit 23 detects a language of each speaker using a known method for each sound signal by speakers input from the sound source separating unit 22. The language information detecting unit 23 outputs information indicating the detected language for each speaker and the sound signals by speakers and the azimuth information input from the sound source separating unit 22 to the speech recognizing unit 13A. The language information detecting unit 23 detects the language of each speaker with reference to, for example, a language database. The language database may be included in the conversation support apparatus 1A or may be connected thereto via a wired or wireless network.

The speech recognizing unit 13A performs a speech recognizing process on the sound signals input from the sound signal acquiring unit 12 on the basis of the information indicating a language for each speaker, the sound signals by speakers, and the azimuth information, which are input from the language information detecting unit 23, to recognize speech details (for example, a text indicating a word or a sentence). The speech recognizing unit 13A outputs the speech details, the information indicating the speakers, the information indicating the direction of the speaker, the recognition data, and the information indicating the language for each speaker to the translation unit 24.

The translation unit 24 translates the speech details if necessary on the basis of the speech details, the information indicating the speakers, and the information indicating a language for each speaker which are input from the speech recognizing unit 13A, adds or replaces information indicating the translated speech details to or for the information input from the speech recognizing unit 13A, and outputs the resultant to the image processing unit 14. Specifically, an example where two speakers of the first speaker Sp1 and the second speaker Sp2 are present as the speakers, the language of the first speaker Sp1 is Japanese, the language of the second speaker Sp2 is English will be described below with reference to FIG. 14. In this case, the translation unit 24 translates the speech details so that the images 534A to 534D displayed in the second character presentation image 532 are translated from Japanese in which the first speaker Sp1 utters speech to English which is the language of the second speaker Sp2 and are then displayed. The translation unit 24 translates the speech details so that the images 524A to 524C displayed in the first character presentation image 522 are translated from English in which the second speaker Sp2 utters speech to Japanese which is the language of the first speaker Sp1 and are then displayed.

GHDSS Method

The GHDSS method used in the sound source separating unit 22 will be schematically described below. The GHDSS method is a method in which a geometric constraint-based source separation (GC) method and a high-order decorrelation-based source separation (HDSS) method are combined. The GHDSS method is a kind of blind deconvolution. In the GHDSS method, an input speech vector is separated into sound signals by sound sources by sequentially calculating a separation matrix $[V(\omega)]$ and multiplying the input speech vector $[x(\omega)]$ by the calculated separation matrix $[V(\omega)]$ to estimate a sound source vector $[u(\omega)]$. The separation matrix $[V(\omega)]$ is a pseudo-inverse matrix of a transfer function matrix $[H(\omega)]$ having transfer functions from the respective sound sources to the microphones 101 of the sound collecting unit 11 as elements. The input speech vector $[x(\omega)]$ is a vector having frequency-domain coefficients of the sound signals of channels as elements. The sound source vector $[u(\omega)]$ is a vector having frequency-domain coefficients of the sound signals emitted from the respective sound sources.

In the GHDSS method, the sound source vector $[u(\omega)]$ is estimated so as to minimize two cost functions such as separation sharpness JSS and geometric constraint JGC at the time of calculating the separation matrix $[V(\omega)]$.

Here, the separation sharpness JSS is an index value indicating a degree to which one sound source is erroneously separated as a different sound source and is expressed by, for example, Expression (1).

$$J_{SS}=\|[u(\omega)][u(\omega)]^*-\mathrm{diag}([u(\omega)][u(\omega)]^*)\|^2 \quad (1)$$

In Expression (1), $\|\ldots\|^2$ represents a Frobenius norm of ..., and * represents the conjugate transpose of a vector or a matrix. diag( ... ) represents a diagonal matrix having diagonal elements of ....

The geometric constraint JGC is an index value indicating a degree of error of the sound source vector [u(co)] and is expressed by, for example, Expression (2).

$$J_{GC}=\|\mathrm{diag}([V(\omega)][A(\omega)]-[I])\|^2 \quad (2)$$

In Expression (2), [I] represents a unit matrix.

When a microphone array is constituted by the microphones 101-1 to 101-N of the sound collecting unit 11, a speaker may not input or select information indicating that the corresponding speaker utters speech to the conversation support apparatus 1A at the time of uttering speech. In this case, the conversation support apparatus 1A can separate the speech into speech pieces by speakers using the microphone array.

Examples of a combination of the units shown in FIG. 16 will be described below. FIG. 17 is a diagram showing examples of the combination of the units corresponding to the microphone array according to the second embodiment.

In FIG. 17, microphone array 1 is a microphone array in which an array of the microphones 101 is assembled into the conversation support apparatus 1A as shown in FIG. 2. Microphone array 2 is a microphone array in which the microphones 101 are connected to the conversation support apparatus 1A in a wired or wireless manner as shown in FIG. 3. Microphone array 3 is a microphone array in which speakers use, for example, close-talking microphones 101 at the mouse thereof and the microphones 101 are connected to the conversation support apparatus 1A in a wired or wireless manner as shown in FIG. 4.

As shown in the first row of FIG. 17, in case of microphone arrays (hereinafter, simply referred to as arrays) 1 to 3, when conditions of localizing or separating the sound signals are good depending on the positions of the speakers, the conversation support apparatus 1A may not include the sound source localizing unit 21 and the sound source separating unit 22. When the translation does not need to be performed or when the languages of the speakers are equal to each other, the conversation support apparatus 1A may not include the language information detecting unit 23 and the translation unit 24. That is, the language information detecting unit 23 and the translation unit 24 may be optional.

As shown in the second row of FIG. 17, in case of microphone arrays 1 and 2, when conditions of separating the sound signals are good depending on the positions of the speakers, the conversation support apparatus 1A may not include the sound source separating unit 22. When the translation does not need to be performed or when the languages of the speakers are equal to each other, the conversation support apparatus 1A may not include the language information detecting unit 23 and the translation unit 24.

As shown in the third row of FIG. 17, in case of microphone arrays 1 and 2, the conversation support apparatus 1A may not include the sound source localizing unit 21 and the sound source separating unit 22 depending on the positions of the speakers. When the translation does not need to be performed or when the languages of the speakers are equal to each other, the conversation support apparatus 1A may not include the language information detecting unit 23 and the translation unit 24.

Figure 18:
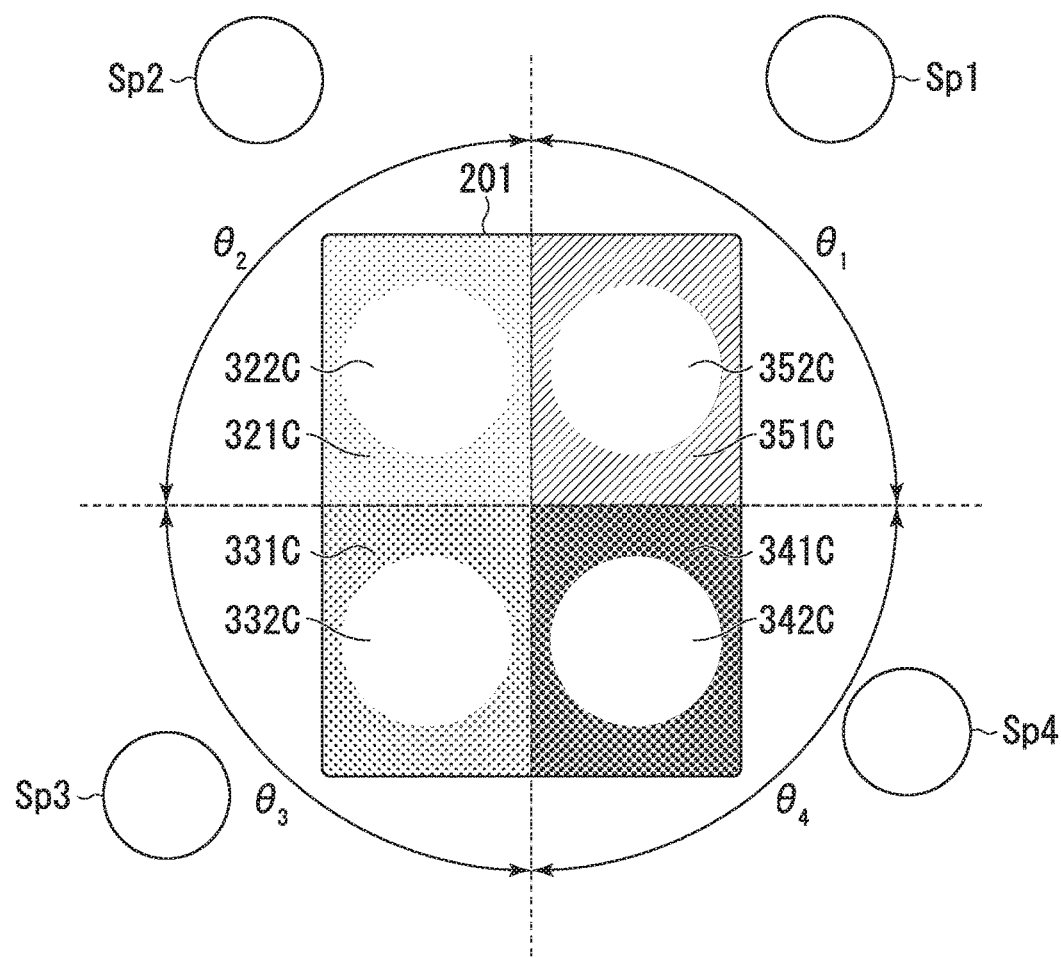
FIG. 18 is a diagram showing an example of sound source localization according to the second embodiment.

FIG. 18 is a diagram showing an example of the sound source localization according to this embodiment.

As shown in FIG. 18, four speakers Sp1 to Sp4 surround the conversation support apparatus 1A. The speaker Sp1 selects the fourth presentation image 351C closest thereto in advance, and the speaker Sp2 selects the first presentation image 321C closest thereto in advance. The speaker Sp3 selects the second presentation image 331C closest thereto in advance and the speaker Sp4 selects the third presentation image 341C closest thereto in advance.

When the speaker Sp1 does not utter speech, the conversation support apparatus 1A cannot estimate the azimuth in which the speaker Sp1 is present. Accordingly, the conversation support apparatus 1A first performs the sound source localization process on the sound signals acquired in the directions of 360 degrees with respect to the surface of the image display unit 15 of the conversation support apparatus 1A. Then, when the speaker Sp1 utters speech, the sound source localization is performed on the basis of the uttered speech. Since the direction of the speaker Sp1 can be estimated by this process, the conversation support apparatus 1A may change a search range of the sound signal of the speaker Sp1, for example, to a range of angle $\theta_1$ on the basis of the fourth presentation image 351C (display area) closest to the speaker Sp1. Accordingly, it is possible to reduce the computation load of the sound source localization process and to further improve the sound source localization accuracy. Similarly, the conversation support apparatus 1A may change a search range of the sound signal of the speaker Sp2, for example, to a range of angle $\theta_2$ on the basis of the first presentation image 321C (display area) closest to the speaker Sp2 after the speaker Sp2 utters speech. The conversation support apparatus 1A may change a search range of the sound signal of the speaker Sp3, for example, to a range of angle $\theta_3$ on the basis of the second presentation image 331C closest to the speaker Sp3 after the speaker Sp3 utters speech, and may change a search range of the sound signal of the speaker Sp4, for example, to a range of angle $\theta_4$ on the basis of the third presentation image 341C closest to the speaker Sp4 after the speaker Sp4 utters speech. The angles of $\theta_1$ to $\theta_4$ are, for example, 90 degrees.

The example where the number of speakers is four is described above with reference to FIG. 18, but the invention is not limited to this example. When the number of speakers is two, the search range of the sound signal for each speaker may be changed, for example, from a range of angle of 360 degrees to a range of angle of 180 degrees on the basis of the display areas (321A, 331A) of the speakers as shown in FIG. 6. Alternative, when the number of speakers is three, the search range of the sound signal for each speaker may be changed, for example, from a range of angle of 360 degrees to a range of angle of 120 degrees. That is, the conversation support apparatus 1A may change the search range of each speaker on the basis of the display areas of the speakers. Accordingly, since the conversation support apparatus 1A can narrow the search range, it is possible to improve the azimuth estimation accuracy and to reduce the computation load of the conversation support apparatus 1A.

For example, the speech recognizing unit 13A may identify the speakers. For example, speech of each speaker is registered in advance in the conversation support apparatus 1A before starting the recognition. Accordingly, for example, when the speaker Sp1 utters speech, the speech recognizing unit 13A may identify the sound signal of the speaker Sp1 from the sound signals separated by the sound source separating unit 22.

The language displayed in an image presented to each speaker may be based on a language selected in advance from a menu. For example, when the speaker Sp1 selects Japanese as the language from the menu, the translation unit 24 may translate the speech uttered in French by another speaker and may display the translation result in the first character presentation image 322C. Accordingly, even when another speaker utters speech in French, English, or Chinese, the conversation support apparatus 1A may display the speech pieces of other speakers in Japanese in the fourth character presentation image 352C in FIG. 18.

Figure 19:
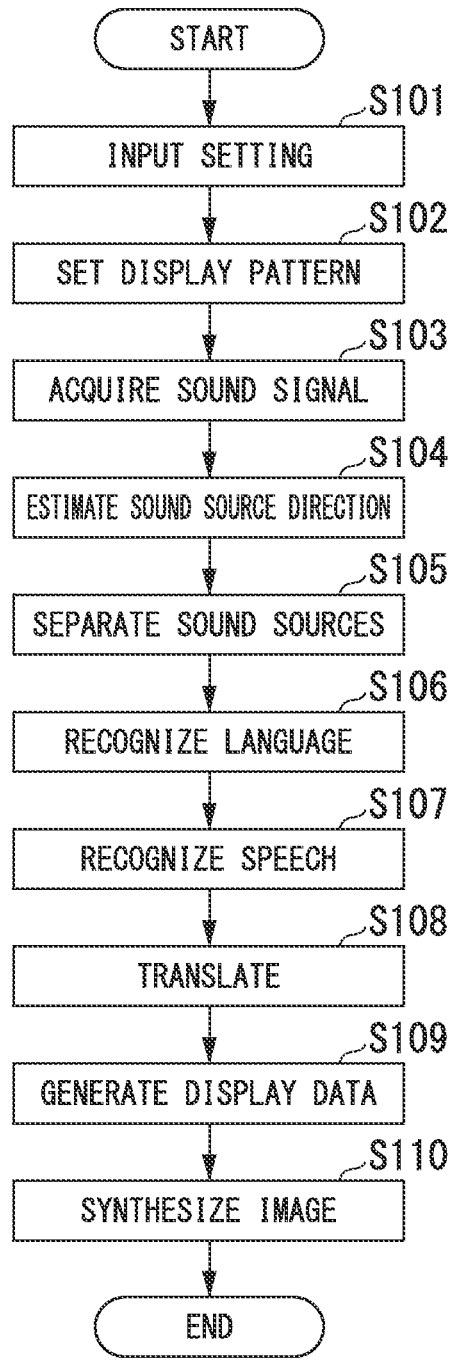
FIG. 19 is a flowchart showing a process flow which is performed by the conversation support apparatus according to the second embodiment.

A process flow which is performed by the conversation support apparatus 1A will be described below. FIG. 19 is a flowchart showing the process flow which is performed by the conversation support apparatus 1A according to this embodiment.

(Steps S101 to S103) Steps S101 to S103 are performed in the same way as steps S1 to S3 (see FIG. 9). In step S101, each speaker may select whether to translate speech of another speaker from the menu image 301.

(Step S104) The sound source localizing unit 21 estimates the azimuth of sound sources on the basis of an input signal input from the sound signal acquiring unit 12 and outputs azimuth information indicating the estimated azimuth and the sound signals of N channels to the sound source separating unit 22. The sound source localizing unit 21 causes the process flow to go to step S105 after step S104 is completed.

(step S105) The sound source separating unit 22 acquires the sound signals of N channels output from the sound source localizing unit 21 and separates the acquired sound signals of N channels into sound signals by speakers, for example, using the GHDSS method. Then, the sound source separating unit 22 outputs the separated sound signals by speakers and the azimuth information input from the sound source localizing unit 21 to the language information detecting unit 23. The sound source separating unit 22 cause the process flow to go to step S106 after step S105 is completed.

(Step S106) The language information detecting unit 23 detects the language of each speaker using a known method for each sound signal by speakers input from the sound source separating unit 22. The language information detecting unit 23 outputs the information indicating the detected language for each speaker and the sound signals by speakers and the azimuth information input from the sound source separating unit 22 to the sound recognizing unit 13A. The language information detecting unit 23 causes the process flow to go to step S107 after step S106 is completed.

(Step S107) The speech recognizing unit 13A performs the speech recognizing process on the sound signals input from the sound signal acquiring unit 12 to recognize the speech details on the basis of the information indicating the language for each speaker, the sound signals by speakers, and the azimuth information which are input from the language information detecting unit 23. Then, the speech recognizing unit 13A outputs the speech details, the information indicating the speakers, the information indicating the directions of the speakers, the recognition data, and the information indicating the language of each speaker to the translation unit 24. The speech recognizing unit 13A causes the process flow to go to step S108 after step S107 is completed.

(Step S108) The translation unit 24 translates the speech details on the basis of the speech details, the information indicating the speakers, and the information indicating the language of each speaker, which are input from the speech recognizing unit 13A, adds or replaces the information indicating the translated speech details to or for the information input from the speech recognizing unit 13A, and outputs the resultant information to the image processing unit 14. The translation unit 24 cause the process flow to go to step S109 after step S108 is completed.

(Steps S109 to S110) Steps S109 to S110 are performed in the same way as steps S5 to S6 (see FIG. 9).

In this way, the process flow which is performed by the conversation support apparatus 1A ends.

In the example shown in FIG. 19, the conversation support apparatus 1A includes all the functional units and use all the functional units shown in FIG. 16, but the invention is not limited to this example. As shown in FIG. 17, the conversation support apparatus 1A may select the functional units and processes to be used depending on the microphone array.

As described above, the conversation support apparatus 1A according to this embodiment includes the sound source estimating unit (the sound source localizing unit 21) configured to estimate the sound source directions of the users, and the image processing unit 14 displays the recognition results of the speech recognizing unit 13A in the display areas, which correspond to the users, of the display unit (the image display unit 15) at the display angles respectively based on the sound source directions estimated by the sound source estimating unit.

The conversation support apparatus 1A according to this embodiment includes the sound source separating unit 22 configured to separate the speech signals input from the speech input unit (the sound collecting unit 11, the sound signal acquiring unit 12) by the users, and the image processing unit 14 displays the recognition results of the speech signals of the users other than one of the users corresponding to one of the display areas, out of the speech signals by the users separated by the sound source separating unit, in the one display area.

According to this configuration, in the conversation support apparatus 1A according to this embodiment, even when the conditions of localizing or separating the sound sources are bad, the sound source localizing unit 21 performs the sound source localization process and the sound source separating unit 22 performs the sound source separation process. Accordingly, it is possible to perform the estimating of the azimuth of each speaker or the separating the speech pieces with high accuracy. As a result, in the conversation support apparatus 1A according to this embodiment, since the speech of the other speakers can be visually confirmed on the conversation support apparatus 1A with high accuracy, it is possible to support the hearing of a speaker.

The conversation support apparatus 1A according to this embodiment includes the translation unit 24 configured to translate the recognition results of the speech recognizing unit 13A, and the image processing unit 14 displays the translation results of the translation unit in the display areas, which respectively correspond to the users, of the display unit (the image display unit 15).

The conversation support apparatus 1A according to this embodiment includes the language information detecting unit 23 configured to detect languages uttered by the users, and the translation unit 24 translates the recognition results of the speech signals of the users other than one of the users corresponding to one of the display areas into the language of the one user detected by the language information detecting unit.

According to this configuration, the conversation support apparatus 1A according to this embodiment includes the language information detecting unit 23 and the translation unit 24. Accordingly, even when the speakers use different languages, the speech of another speaker can be visually displayed in the conversation support apparatus 1A if necessary. As a result, in the conversation support apparatus 1A according to this embodiment, since the speech of the other speakers can be visually confirmed on the conversation support apparatus 1A with high accuracy, it is possible to support the hearing of a speaker.

This embodiment describes the example where the plurality of speakers use the conversation support apparatus 1A, but the invention is not limited to this example. The conversation support apparatus 1A may be used by a single speaker. For example, when the speaker registers Japanese as the language in the initial state and utters speech in English, the conversation support apparatus 1A may translate the English speech uttered by the speaker into Japanese which is the registered language and may display the Japanese text in the presentation area of the image corresponding to the speaker. Accordingly, the conversation support apparatus 1A according to this embodiment can achieve an effect of foreign language learning support.

In this embodiment, when one speaker leaves, the leaving speaker may input or select information indicating the leaving to the conversation support apparatus 1A.

For example, when the number of speakers decreases from four to three, the conversation support apparatus 1A may change the layout shown in FIG. 8 to the layout shown in FIG. 7.

On the other hand, when a speaker participates in the way, the participating speaker may input or select information indicating the participating to the conversation support apparatus 1A. For example, the number of speakers increases from three to four, the conversation support apparatus 1A may change the layout shown in FIG. 7 to the layout shown in FIG. 8.

Figure 20:
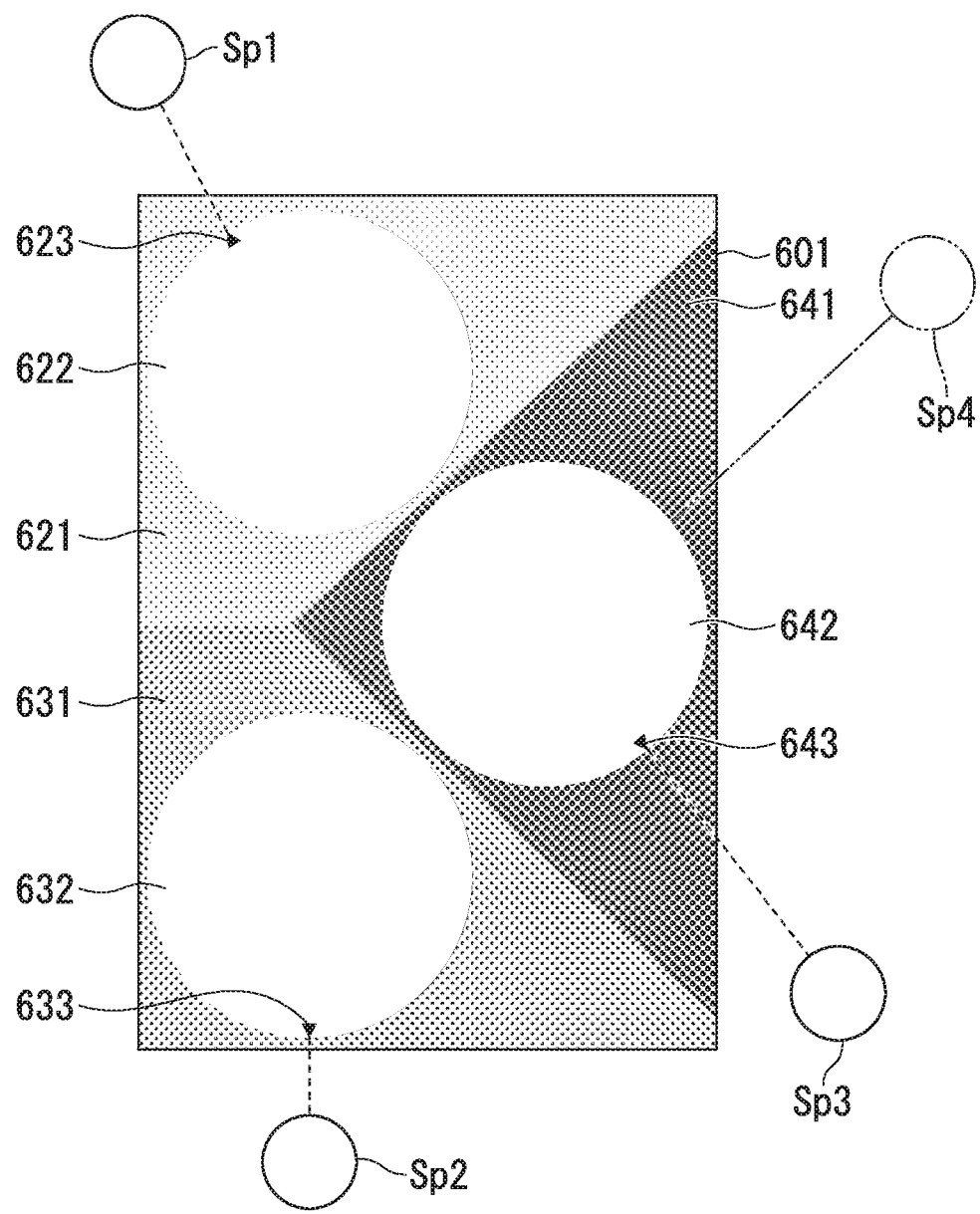
FIG. 20 is a diagram showing a process when the number of speakers is changed according to the second embodiment.

FIG. 20 is a diagram showing a process when the number of speakers is changed according to the second embodiment. In the example shown in FIG. 20, three speakers Sp1 to Sp3 use the conversation support apparatus 1A. In FIG. 20, the uttering directions of the speakers Sp1 to Sp3 have already been estimated.

For example, when the positions of the three speakers Sp1 to Sp3 are not almost changed and a sound signal having an uttering direction different from those of the speakers Sp1 to Sp3 is present in the sound signals localized by the sound source localizing unit 21, the conversation support apparatus 1A may determine that a new speaker Sp4 is participating in the conversation. In the example shown in FIG. 20, the speaker Sp4 utters speech obliquely from the upper-right side in the drawing. In this case, the conversation support apparatus 1A estimates the uttering direction of the new speaker Sp4 and may switch the display screen to the display screen corresponding to four speakers as shown in FIG. 8 on the basis of the estimation result. In this case, since the position of the speaker Sp4 is located between the speakers Sp1 and Sp3, the conversation support apparatus 1A may lay out again the display areas so as to insert the display area of the information corresponding to the speaker Sp4 between the first presentation image 621 and the third presentation image 641.

Third Embodiment

The first and second embodiments describe the example where only one conversation support apparatus 1 or only one conversation support apparatus 1A is used, but this embodiment describes an example where a plurality of conversation support apparatuses 1 or conversation support apparatuses 1A are used. The plurality of conversation support apparatuses 1 or conversation support apparatuses 1A may be used by, for example, the respective speakers.

Figure 21:
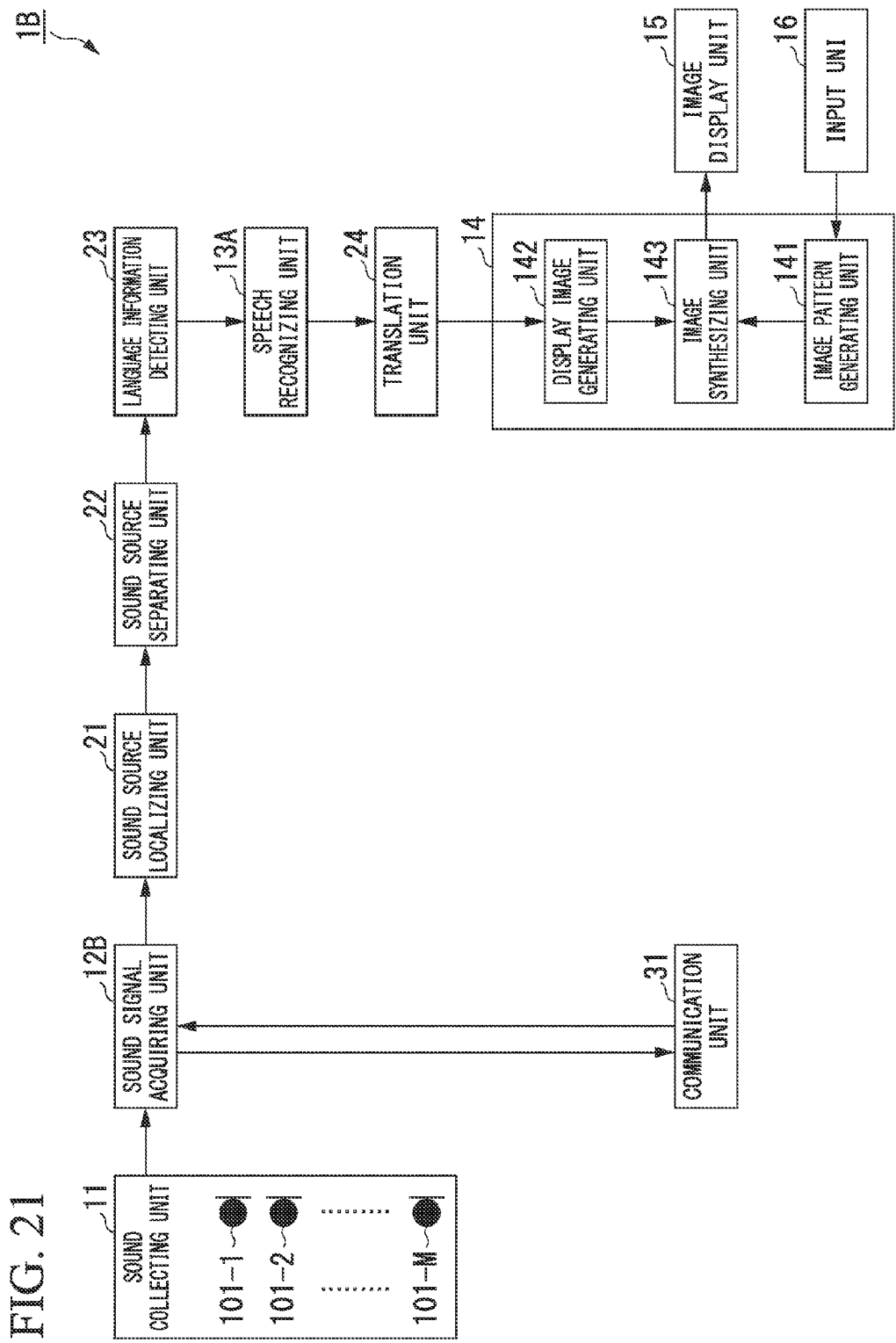
FIG. 21 is a block diagram showing a configuration of a conversation support apparatus according to a third embodiment of the invention.

FIG. 21 is a block diagram showing a conversation support apparatus 1B according to this embodiment. As shown in FIG. 21, the conversation support apparatus 1B includes a sound collecting unit 11, a sound signal acquiring unit 12B, a speech recognizing unit 13A, an image processing unit 14, an image display unit 15, an input unit 16, a sound source localizing unit 21, a sound source separating unit 22, a language information detecting unit 23, a translation unit 24, and a communication unit 31. The image processing unit 14 includes an image pattern generating unit 141, a display image generating unit 142, and an image synthesizing unit 143.

The functional units having the same functions as in the conversation support apparatus 1A described with reference to FIG. 16 will be referenced with the same reference numerals and a description thereof will not be repeated. FIG. 21 shows the example where the conversation support apparatus 1B has a configuration based on the conversation support apparatus 1A shown in FIG. 16, but the conversation support apparatus 1B may have a configuration based on the conversation support apparatus 1 shown in FIG. 1. That is, the conversation support apparatus 1B may not include a certain functional unit of the sound source localizing unit 21, the sound source separating unit 22, the language information detecting unit 23, and the translation unit 24 depending on the intended application thereof.

The sound signal acquiring unit 12B acquires M sound signals recorded by M (where M is an integer greater than 1) microphones 101 of the sound collecting unit 11. For example, when M is equal to two, two sound signals recorded by two microphones 101 are acquired. The sound signal acquiring unit 12B outputs the acquired M sound signals to the sound source localizing unit 21 and the communication unit 31. The sound signal acquiring unit 12B acquires L (where L is an integer equal to or greater than one) sound signals input from the communication unit 31. The sound signal acquiring unit 12B outputs the acquired L sound signals to the sound source localizing unit 21. When the sound signals acquired from the communication unit 31 includes identification information for identifying terminals, the sound signal acquiring unit 12B may output the identification information to the sound source localizing unit 21.

The communication unit 31 transmits the M sound signals input from the sound signal acquiring unit 12B to another conversation support apparatus 1B. The communication unit 31 outputs the L sound signals received from another conversation support apparatus 1B to the sound signal acquiring unit 12B. For example, when two sound signals are received from three conversation support apparatuses 1B, the communication unit 31 outputs the received six (=2×3) sound signals to the sound signal acquiring unit 12B. The communication unit 31 may output the sound signals including identification information for identifying terminals to the sound signal acquiring unit 12B.

Figure 22:
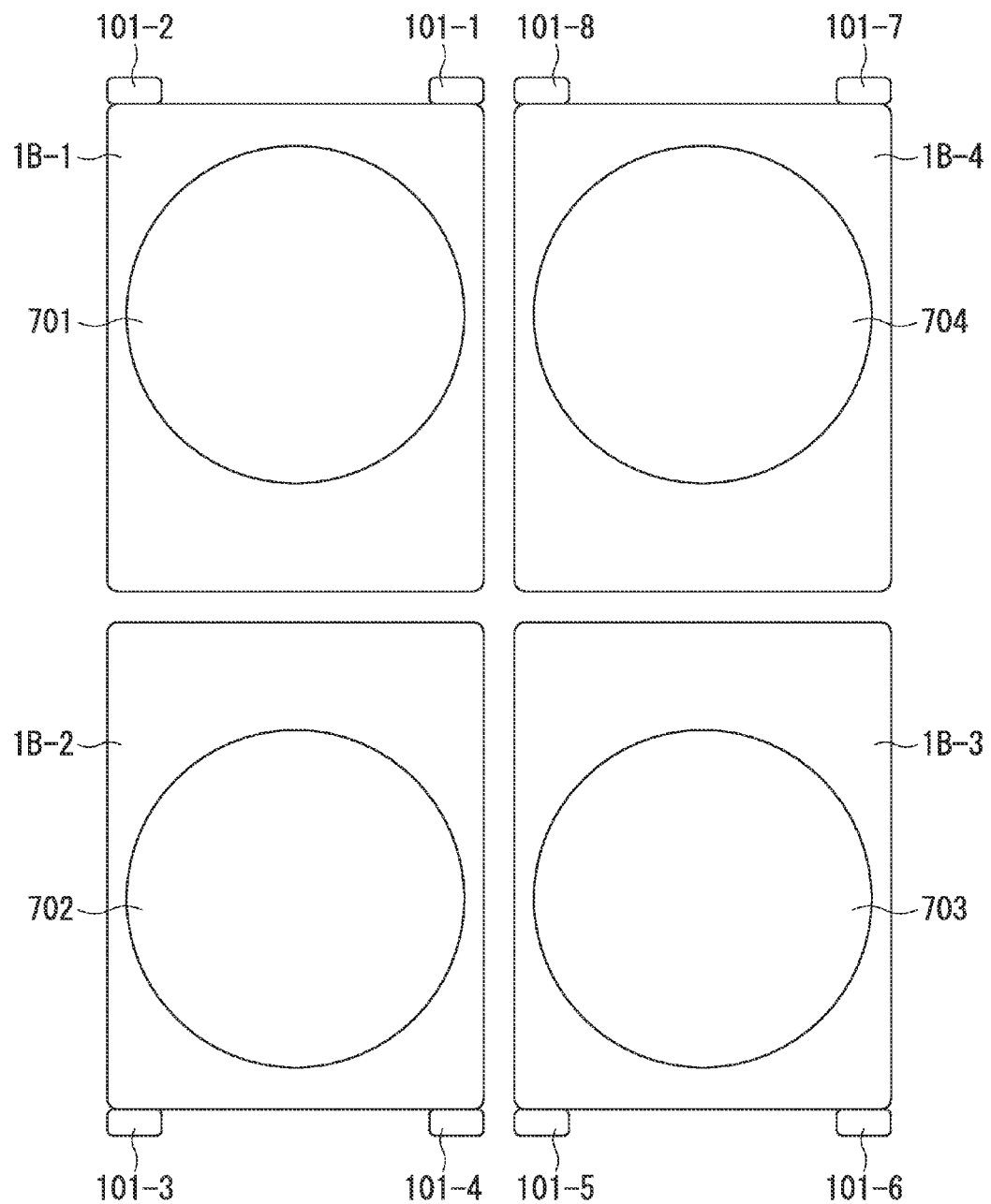
FIG. 22 is a diagram showing an example of an arrangement of a plurality of conversation support apparatuses according to the third embodiment.

FIG. 22 is a diagram showing an example of an arrangement of a plurality of conversation support apparatuses 1B according to this embodiment. In the example shown in FIG. 22, four conversation support apparatuses 1B-1 to 1B-4 are arranged in a lattice shape. Each of the conversation support apparatuses 1B-1 to 1B-4 includes two microphones 101 out of microphones 101-1 to 101-8. For example, the conversation support apparatus 1B-1 includes the microphones 101-1 and the microphone 101-2.

The configurations of the conversation support apparatuses 1B-1 to 1B-4 are the same as those shown in FIG. 21. The conversation support apparatuses 1B-1 to 1B-4 communicate with each other through the corresponding communication unit 31 disposed therein.

As shown in FIG. 22, the image display unit 15 of each of the conversation support apparatuses 1B-1 to 1B-4 has a single display area of information provided thereto and has a single character presentation image 701 to 704. Texts obtained by recognizing the speech details uttered by the speakers of the conversation support apparatuses 1B-2 to 1B-4 are displayed in the single character presentation image 701 of the conversation support apparatus 1B-1. Texts obtained by recognizing the speech details uttered by the speakers of the conversation support apparatuses 1B-1, 1B-3, and 1B-4 are displayed in the single character presentation image 702 of the conversation support apparatus 1B-2. Texts obtained by recognizing the speech details uttered by the speakers of the conversation support apparatuses 1B-1, 1B-2, and 1B-4 are displayed in the single character presentation image 703 of the conversation support apparatus 1B-3. Texts obtained by recognizing the speech details uttered by the speakers of the conversation support apparatuses 1B-1 to 1B-3 are displayed in the single character presentation image 704 of the conversation support apparatus 1B-4.

That is, when four conversation support apparatuses 1B-1 to 1B-4 are used as shown in FIG. 22, the sound signals collected by the conversation support apparatus 1B-1 are transmitted to the other conversation support apparatuses 1B-2 to 1B-4 by wireless communication with the communication unit 31. On the other hand, the sound signals collected by the other conversation support apparatuses 1B-2 to 1B-4 are transmitted to the conversation support apparatus 1B-1 by wireless communication with the communication unit 31. As a result, the conversation support apparatus 1B-1 performs a speech recognizing process on the sound signals received from the conversation support apparatuses 1B-2 to 1B-4 and displays characters as the speech recognition result on the image display unit 15. The conversation support apparatuses 1B-1 to 1B-4 may directly recognize the sound signals received from the other conversation support apparatuses 1B.

FIG. 22 shows the example where four conversation support apparatuses 1B-1 to 1B-4 are arranged to be adjacent to each other, but the invention is not limited to this example. For example, the conversation support apparatuses 1B-1 to 1B-4 may be arranged in the vicinity of the corresponding speakers.

Figure 23:
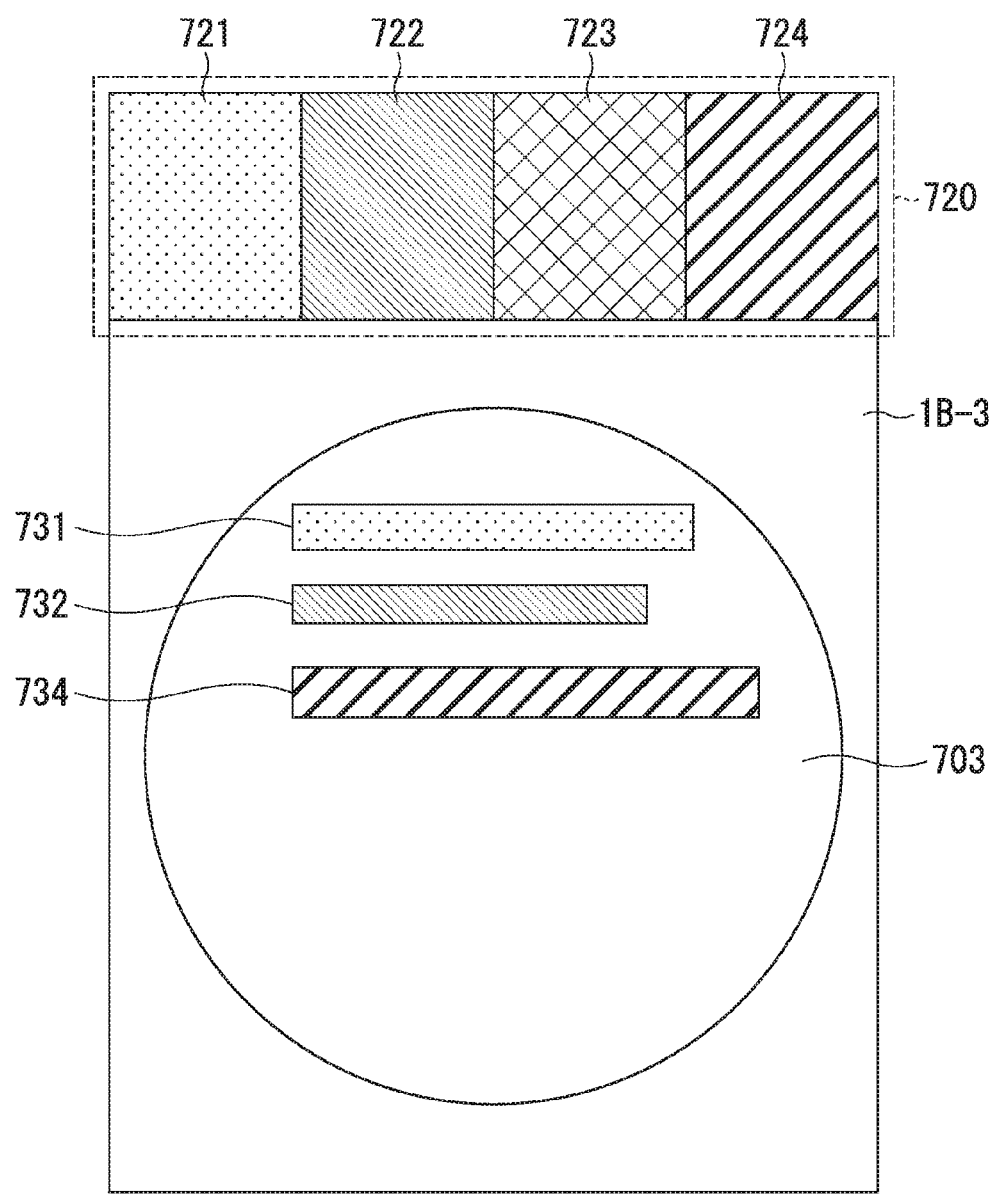
FIG. 23 is a diagram showing an example of an image which is displayed on an image display unit of each conversation support apparatus according to the third embodiment.

FIG. 23 is a diagram showing an example of an image which is displayed on the image display unit 15 of each conversation support apparatus 1B according to this embodiment. FIG. 23 also shows an example of an image which is displayed on the image display unit 15 of the conversation support apparatus 1B-3 out of four conversation support apparatuses 1B-1 to 1B-4 as shown in FIG. 22.

In FIG. 23, an image of an area indicated by reference numeral 720 corresponds to the speakers. The image of the area indicated by reference numeral 720 includes an image 721 indicating the speaker corresponding to the conversation support apparatus 1B-1, an image 722 indicating the speaker corresponding to the conversation support apparatus 1B-2, an image 723 indicating the speaker corresponding to the conversation support apparatus 1B-3, and an image 724 indicating the speaker corresponding to the conversation support apparatus 1B-4. The image 721 is, for example, red, the image 722 is, for example, green, the image 723 is, for example, blue, and the image 724 is, for example, yellow. The images 721 to 724 corresponding to the conversation support apparatuses 1B-1 to 1B-4 are not limited to the images with the above-mentioned colors. For example, the images 721 to 724 may be avatars, icons, names, or the like corresponding to the conversation support apparatuses 1B-1 to 1B-4.

Images disposed in a character presentation image 703 includes an image 731 based on the recognition data of the speech of the speaker corresponding to the conversation support apparatus 1B-1, an image 732 based on the recognition data of the speech of the speaker corresponding to the conversation support apparatus 1B-2, and an image 734 based on the recognition data of the speech of the speaker corresponding to the conversation support apparatus 1B-4. These images 731 to 734 may be displayed in the colors corresponding to the images 721 to 724 or may be displayed with avatars, icons, names, or the like added thereto. The avatar, the icon, or the name may be added to and displayed on the left side of each of the images 731 to 734. This display process is performed by the image processing unit 14.

Only a single conversation support apparatus 1B may have all the functional units. The other three conversation support apparatuses may include the sound collecting unit 11, the sound signal acquiring unit 12B, the communication unit 31, the image processing unit 14, and the image display unit 15. In this case, the conversation support apparatus 1B having all the functional units may acquire the sound signals from the other conversation support apparatuses 1B by communications and may perform the sound source localization process, the sound source separation process, the speech recognizing process, the image generating process, and the like. The generated image may be transmitted to the conversation support apparatus 1B.

Figure 24:
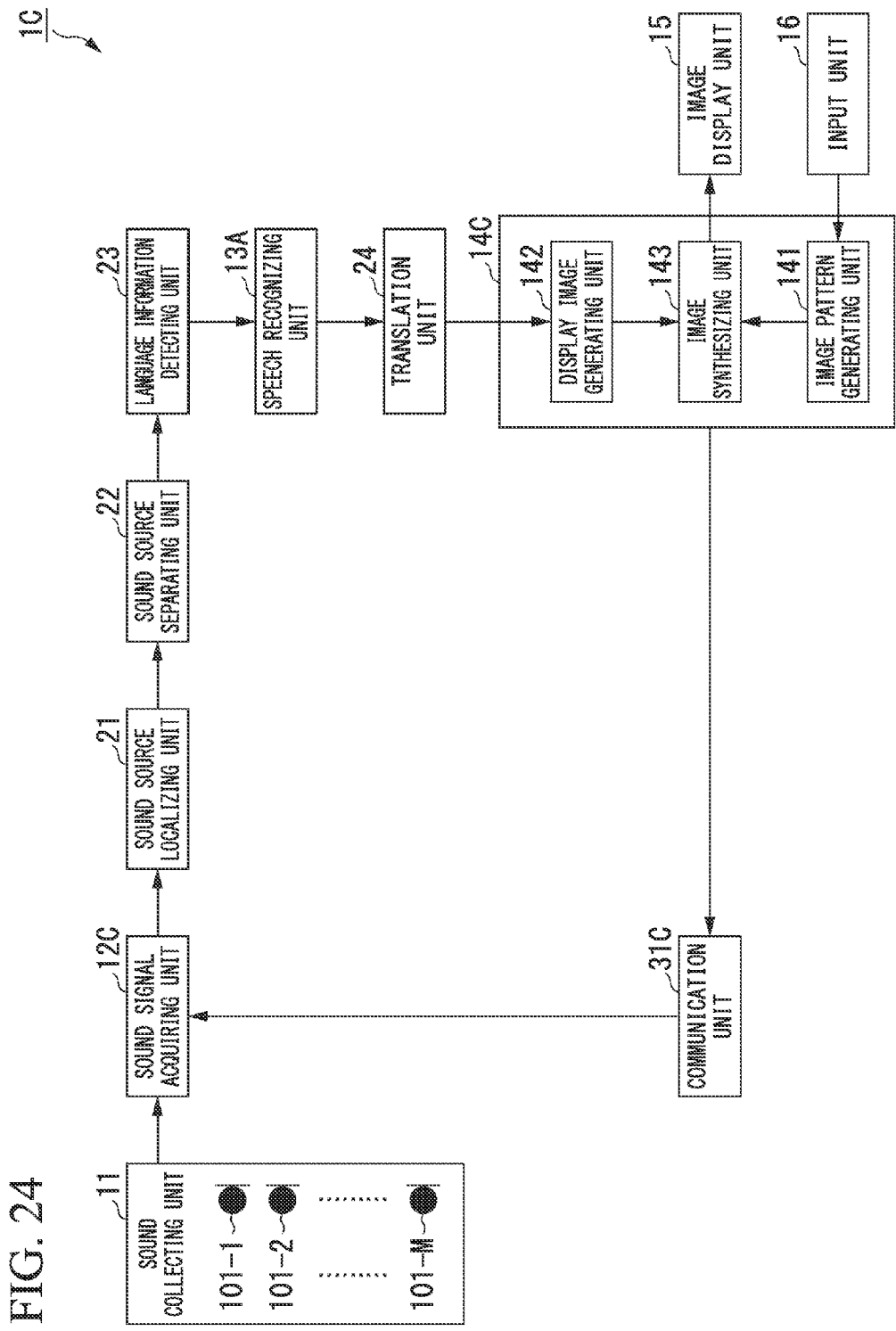
FIG. 24 is a block diagram showing a configuration of the conversation support apparatus according to the third embodiment.

FIG. 24 is a block diagram showing a configuration of a conversation support apparatus 1C according to this embodiment. As shown in FIG. 24, the conversation support apparatus 1C includes a sound collecting unit 11, a sound signal acquiring unit 12C, a speech recognizing unit 13A, an image processing unit 14C, an image display unit 15, an input unit 16, a sound source localizing unit 21, a sound source separating unit 22, a language information detecting unit 23, a translation unit 24, and a communication unit 31C. The functional units having the same functions as in the conversation support apparatus 1B described with reference to FIG. 21 will be referenced by the same reference numerals and description thereof will not be repeated. FIG. 24 shows the example where the conversation support apparatus 1C has a configuration based on the conversation support apparatus 1B shown in FIG. 21, but the conversation support apparatus 1C may have a configuration based on the conversation support apparatus 1 shown in FIG. 1. That is, the conversation support apparatus 1C may not include a certain functional unit of the sound source localizing unit 21, the sound source separating unit 22, the language information detecting unit 23, and the translation unit 24 depending on the intended application thereof.

The sound signal acquiring unit 12C acquires M sound signals recorded by M (where M is an integer greater than 1) microphones 101 of the sound collecting unit 11. The sound signal acquiring unit 12C outputs the acquired M sound signals to the sound source localizing unit 21. The sound signal acquiring unit 12C acquires L (where L is an integer equal to or greater than one) sound signals input from the communication unit 31C and outputs the acquired L sound signals to the sound source localizing unit 21. When the sound signals acquired from the communication unit 31C includes identification information for identifying terminals, the sound signal acquiring unit 12C may output the identification information to the sound source localizing unit 21.

The image processing unit 14C generates character data of the terminals corresponding to the speakers and an image indicating the direction of the speakers on the basis of the information indicating the speakers, the information indicating the directions of the speakers, and the recognition data which are output from the translation unit 24. The image processing unit 14C outputs the generated character data of the terminals corresponding to the speakers and the generated image indicating the directions of the speakers to the communication unit 31C. The image processing unit 14C displays the character data of the terminals corresponding to the speakers corresponding to the terminals and the image indicating the directions of the speakers on the image display unit 15.

The communication unit 31C outputs the L sound signals received from another conversation support apparatus 1C to the sound signal acquiring unit 12C. The communication unit 31C transmits the character data of the terminals corresponding to the speakers and the image indicating the directions of the speakers, which are input from the image processing unit 14C, to the corresponding other conversation support apparatuses 1C by wireless communication.

For example, in FIG. 22, when the conversation support apparatus 1B-1 is defined as the conversation support apparatus 1C-1 having all the functional units, the conversation support apparatuses 1B-2 to 1B-4 are defined as the conversation support apparatuses 1C-2 to 1C-4 having some functional units. It is assumed that the first speaker Sp1 uses the conversation support apparatus 1C-1, the second speaker Sp2 uses the conversation support apparatus 1C-2, the third speaker Sp3 uses the conversation support apparatus 1C-3, and the fourth speaker Sp4 uses the conversation support apparatus 1C-4.

In this case, the conversation support apparatuses 1C-2 to 1C-3 each transmit the collected M sound signals to the conversation support apparatus 1C-1 by wireless communication with the communication unit 31C. The conversation support apparatus 1C-1 performs a speech recognizing process on all of the sound signals collected by the conversation support apparatus 1C-1 and the received sound signals.

The image processing unit 14C displays the image indicating the direction of the first speaker Sp1 and the character data obtained by recognizing the speech details of the second to fourth speakers Sp2 to Sp4 on the image display unit 15 of the conversation support apparatus 1C-1.

The image processing unit 14C generates the image indicating the direction of the second speaker Sp2 and the character data obtained by recognizing the speech details of the first speaker Sp1, the third speaker Sp3, and the fourth speaker Sp4. The communication unit 31C transmits the generated image indicating the direction of the second speaker Sp2 and the generated character data obtained by recognizing the speech details of the first speaker Sp1, the third speaker Sp3, and the fourth speaker Sp4 to the conversation support apparatus 1C-2 by wireless communication.

Similarly, the communication unit 31C transmits the image indicating the direction of the third speaker Sp3 and the character data obtained by recognizing the speech details of the first speaker Sp1, the second speaker Sp2, and the fourth speaker Sp4, which are generated by the image processing unit 14C, to the conversation support apparatus 1C-3 by wireless communication.

The communication unit 31C transmits the image indicating the direction of the fourth speaker Sp4 and the character data obtained by recognizing the speech details of the first to third speakers Sp1 to Sp3, which are generated by the image processing unit 14C, to the conversation support apparatus 1C-4 by wireless communication.

As described above, the conversation support apparatuses 1B or 1C according to this embodiment includes the communication unit 31 or 31C configured to communicate with another conversation support apparatus, the speech input unit (the sound collecting unit 11, the sound signal acquiring unit 12B or 12C) inputs a speech signal received from another conversation support apparatus by the communication unit, and the speech recognizing unit 13A recognizes a speech signal of an user other than the users corresponding to the display areas out of the speech signals input from the speech input unit.

According to this configuration, the conversation support apparatus 1B or 1C can recognize speech using the plurality of conversation support apparatuses 1B.

Fourth Embodiment

The first to third embodiments describe the example of an image based on the recognition data, which is obtained by recognizing the speech details of other speakers, in the character presentation images corresponding to the speakers, but the invention is not limited to this example. This embodiment is not limited to the other speakers, but an example where an image based on the recognition data obtained by recognizing the speech details including the self-speech is displayed will be described below.

Figure 25:
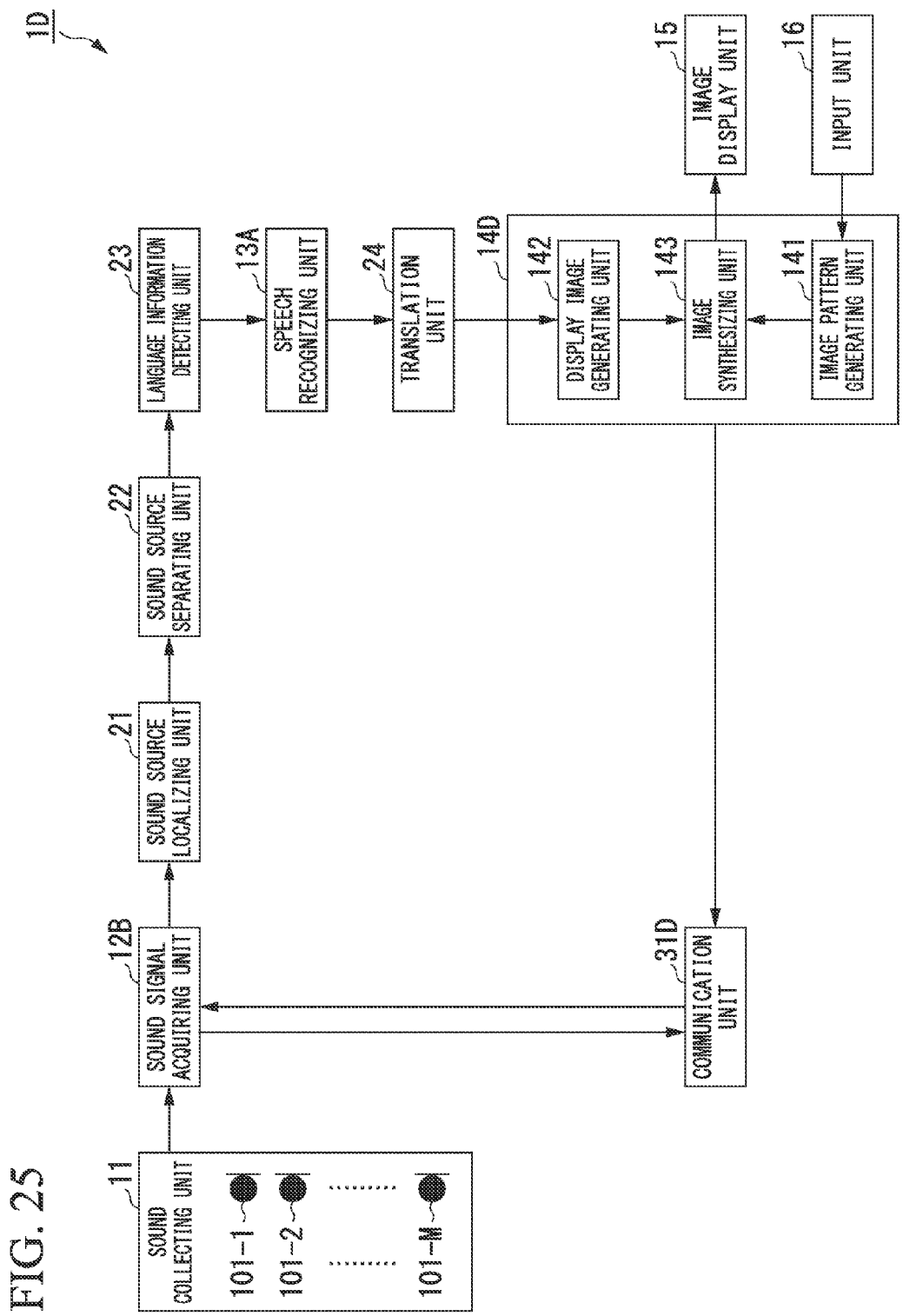
FIG. 25 is a block diagram showing a configuration of a conversation support apparatus according to a fourth embodiment of the invention.

FIG. 25 is a block diagram showing a configuration of a conversation support apparatus 1D according to a fourth embodiment of the invention. As shown in FIG. 25, the conversation support apparatus 1D includes a sound collecting unit 11, a sound signal acquiring unit 12B, a speech recognizing unit 13A, an image processing unit 14D, an image display unit 15, an input unit 16, a sound source localizing unit 21, a sound source separating unit 22, a language information detecting unit 23, a translation unit 24, and a communication unit 31D. The functional units having the same functions as in the conversation support apparatus 1B described with reference to FIG. 21 will be referenced by the same reference numerals and description thereof will not be repeated. FIG. 25 shows the example where the conversation support apparatus 1D has a configuration based on the conversation support apparatus 1B shown in FIG. 21, but the conversation support apparatus 1D may have a configuration based on the conversation support apparatus 1 shown in FIG. 1. That is, the conversation support apparatus 1D may not include a certain functional unit of the sound source localizing unit 21, the sound source separating unit 22, the language information detecting unit 23, and the translation unit 24 depending on the intended application thereof.

The image processing unit 14D displays character data, which is obtained by recognizing speech details of a speaker using the conversation support apparatus 1D, on the image display unit 15. The image processing unit 14D outputs the character data, which is obtained by recognizing the speech details of the speaker using the conversation support apparatus 1D, to the communication unit 31D. The image processing unit 14D corrects the character data, which is obtained by recognizing the speech details of the speaker using the conversation support apparatus 1D, on the basis of the operation of the input unit 16 which is a touch panel disposed on the image display unit 15 and outputs the corrected character data to the communication unit 31D.

The communication unit 31D transmits the character data, which is obtained by recognizing the speech details of the speaker using the conversation support apparatus 1D and is input from the image processing unit 14D, to another conversation support apparatus 1D by wireless communication. The communication unit 31D transmits the corrected character data input from the image processing unit 14D to another conversation support apparatus 1D by wireless communication. After the character data is input which is obtained by recognizing the speech details of the speaker using the conversation support apparatus 1D, the communication unit 31D may delay the transmitting of the character data for a predetermined period of time and may determine whether the corrected character data is input. When the corrected character data is not input for the predetermined period of time, the communication unit 31D may transmit the delayed character data to another conversation support apparatus 1D. On the other hand, when the corrected character data is input for the predetermined period of time, the communication unit 31D may not transmit the delayed character data but may transmit only the input corrected character data to another conversation support apparatus 1D.

Figure 26:
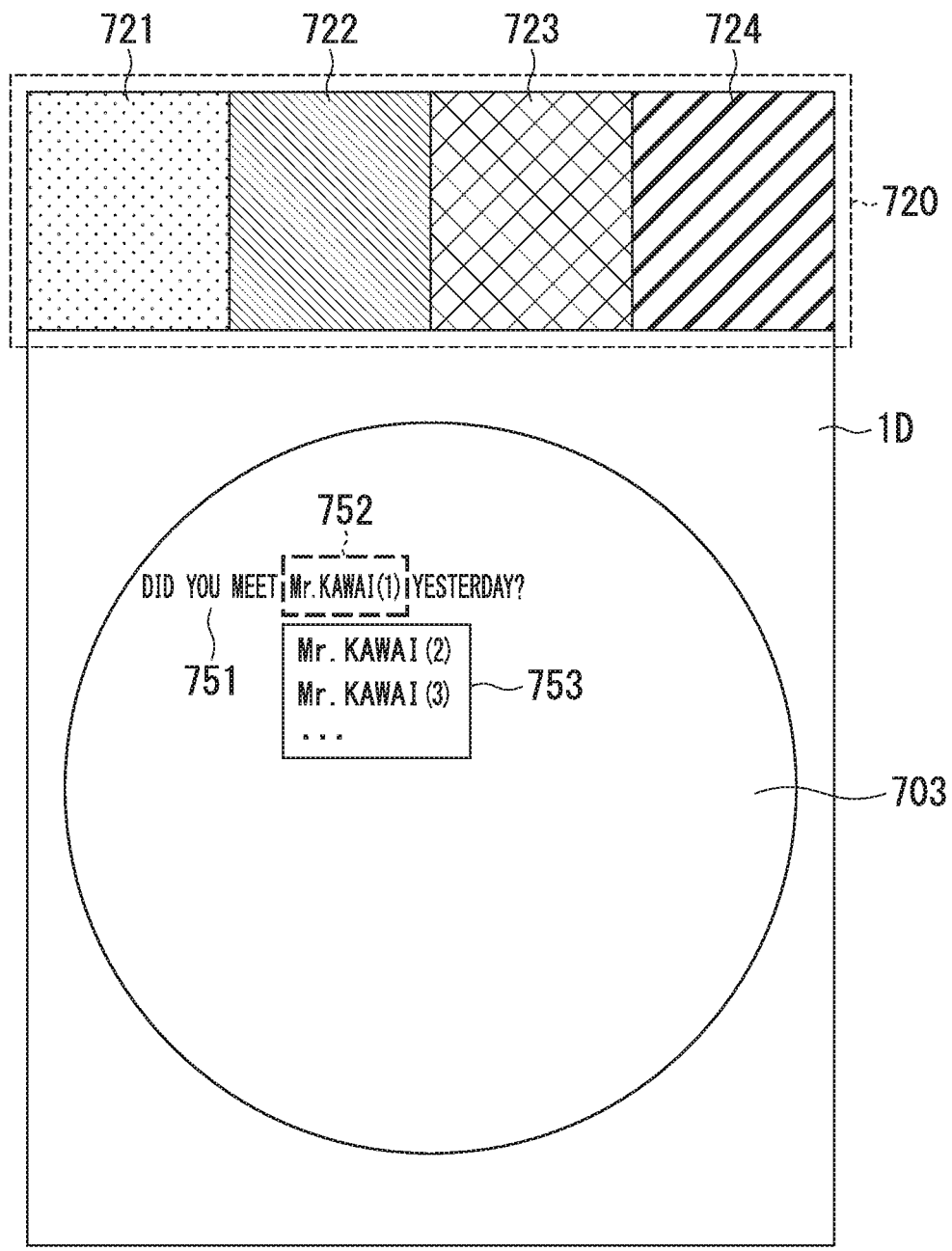
FIG. 26 is a diagram showing an example of an image which is displayed on an image display unit of the conversation support apparatus according to the fourth embodiment.

FIG. 26 is a diagram showing an example of an image which is displayed on the image display unit 15 of the conversation support apparatus 1D according to this embodiment. FIG. 26 shows an example of an image which is displayed on the image display unit 15 of the conversation support apparatus 1D located at the position corresponding to the conversation support apparatus 1B-3 in FIG. 22 when four conversation support apparatuses 1D are used. In the following description, in FIG. 22, it is assumed that the conversation support apparatus 1B-1 is shown in the conversation support apparatus 1D-1 and the conversation support apparatus 1D-1 is used by the first speaker Sp1. Similarly, it is assumed that the conversation support apparatus 1B-2 is shown in the conversation support apparatus 1D-2 and the conversation support apparatus 1D-2 is used by the second speaker Sp2. It is assumed that the conversation support apparatus 1B-3 is shown in the conversation support apparatus 1D-3 and the conversation support apparatus 1D-3 is used by the third speaker Sp3. It is assumed that the conversation support apparatus 1B-4 is shown in the conversation support apparatus 1D-4 and the conversation support apparatus 1D-4 is used by the fourth speaker Sp4.

In FIG. 26, an image 751 is character data obtained by recognizing speech details uttered by the third speaker Sp3. The image 751 is a recognition result obtained by recognizing a sound signal of "Did you meet Mr. Kawai yesterday?" uttered by the third speaker Sp3. However, the third speaker Sp3 intends to speak "Mr. Kawai" as "Mr. Kawai(2)" but "Mr. Kawai(1)" is displayed as the recognition result thereof (here, "Kawai(1)" and "Kawai(2)" are pronounced as [kawai] but are different names expressed by different Kanji characters in Japanese). When the image 751 is not displayed on the image display unit 15 of the conversation support apparatus 1D-3 but is displayed on only the image display unit 15 of the respective conversation support apparatuses 1D-1, 1D-2, and 1D-4, the first speaker Sp1, the second speaker Sp2, and the fourth speaker Sp4 do not understand "Mr. Kawai(1)" and thus the conversation may not be established.

Accordingly, in this embodiment, the character data obtained by recognizing the self-speech details is also displayed on the image display unit 15.

Accordingly, the third speaker Sp3 selects, for example, a differently-recognized image 752 by confirming the image 751 and operating the input unit 16 as a touch panel of the image display unit 15.

The image processing unit 14D displays an image 753 including "Mr. Kawai(2)", "Mr. Kawai(3)", and the like (here, "Kawai(2)" and "Kawai(3)" are pronounced as [kawai] but are different names expressed by different Kanji characters in Japanese), which are other substitutions corresponding to the selected image 752, in the vicinity of the selected image 752, for example, as shown in FIG. 26. Accordingly, the third speaker Sp3 selects the desired "Mr. Kawai(2)" from the image 753. The input unit 16 may output information indicating the selected "Mr. Kawai(2)" to the image processing unit 14D. The communication unit 31D of the conversation support apparatus 1D-3 may transmit the character data corrected by the image processing unit 14D to the other conversation support apparatuses 1D.

The example where the invention is applied to a plurality of conversation support apparatuses 1D as shown in FIG. 22, but the invention is not limited to this example. As described in the first and second embodiments, the invention may be applied to the single conversation support apparatus 1 or 1A.

For example, in FIG. 8, the conversation support apparatus 1 or 1A may display the character data, which is obtained by recognizing the speech details of the first speaker Sp1, in the first character presentation image 322A.

As described above, the conversation support apparatus 1D according to this embodiment includes the input unit 16 configured to select a part of an image displayed on the display unit (the image display unit 15), and the image processing unit 14D displays other recognition candidates corresponding to the selected part on the display unit when the part of the image selected by the input unit is the recognition result displayed on the display unit, corrects the recognition result to the recognition candidate selected by the input unit out of the recognition candidates, and transmits the corrected recognition result to the other conversation support apparatuses through the use of the communication unit 31D.

According to this embodiment, it is possible to correctly present the speech details of a user to the other users.

The first to fourth embodiments describe the examples where the number of speakers is two to four, but the invention is not limited to these examples and the number of speakers may be five or more. In this case, the image pattern generating unit 141 generates a display pattern corresponding to the number of speakers. As described in the third embodiment, it is possible to cope with five or more speakers by using the conversation support apparatus for each speaker.

When the plurality of conversation support apparatuses (1, 1A, 1B, 1C, 1D) are used, the third and fourth embodiments describe the example where an image corresponding to one speaker is displayed on the image display unit 15 of one conversation support apparatus (1, 1A, 1B, 1C, 1D), but the invention is not limited to this example. When the plurality of conversation support apparatuses (1, 1A, 1B, 1C, 1D) are used, the display pattern displayed in each conversation support apparatus (1, 1A, 1B, 1C, 1D) may be a screen corresponding to the plurality of speakers, for example, as shown in FIGS. 6 to 8. For example, according to the third and fourth embodiments, two conversation support apparatuses (1, 1A, 1B, 1C, 1D) can be used to cope with four speakers by displaying the display pattern shown in FIG. 6 on the image display unit 15 of each conversation support apparatus (1, 1A, 1B, 1C, 1D).

In the first to fourth embodiments, a tablet terminal or the like is an exemplary example of the conversation support apparatus 1, 1A, 1B, or 1D, but the invention is not limited to this example. For example, the conversation support apparatus 1, 1A, 1B, or 1D may be applied to an apparatus including the image display unit 15 on a table. Alternatively, the conversation support apparatus 1, 1A, 1B, or 1D may be applied to an electronic blackboard or the like. When a conversation support apparatus is constituted by the plurality of terminals as described in the third embodiment, the respective terminals may not be arranged, for example, in the same room. For example, the plurality of conversation support apparatuses 1, 1A, 1B, or 1D may be arranged in different rooms. The plurality of conversation support apparatuses 1, 1A, 1B, or 1D may be mounted on, for example, a plurality of vehicles or the like. When a plurality of terminals are connected via a network, the plurality of conversation support apparatuses 1, 1A, 1B, or 1D may be arranged, for example, in different countries or regions. Accordingly, it is possible to support the hearing of the plurality of speakers located in remote areas.

In the first to fourth embodiments, the conversation support apparatus 1, 1A, 1B, or 1D may display, for example, the image corresponding to the newest speech out of the images indicating characters, which are obtained by recognizing the speech of the speakers and are displayed in the image display area, for example, to be dark and may display the images corresponding to the previous speech to be light. For example, the conversation support apparatus 1, 1A, 1B, or 1D may display the image corresponding to the newest speech with heavy characters and may display the images corresponding to the previous speech with slender characters. Alternatively, the size of characters used for the images corresponding to the previous speech may be set to be larger than the size of characters used for the image corresponding to the newest speech.

The first to fourth embodiments describe the example where the positions at which the images obtained by recognizing the speech of the speakers are arranged, for example, sequentially from up to down in FIG. 14, but the invention is not limited to this example. In FIG. 14, for example, the conversation support apparatus 1, 1A, 1B, or 1D may display the image corresponding to the newest speech substantially at the center of the first character presentation image 522 of the first presentation image 521 and may display the images corresponding to the previous speech on the upper side thereof.

In the first to fourth embodiments, the conversation support apparatus 1, 1A, 1B, or 1D may display the images, for example, while changing the brightness of the display areas (for example, the first presentation image 321A) of the information presented to the speakers or the character presentation images (for example, the first character presentation image 322A) in the display areas. The conversation support apparatus 1, 1A, 1B, or 1D may detect, for example, an uttering frequency or an uttering time for each speaker and may control the display area or the character presentation image of the speaker, of which the detected uttering frequency or the detected uttering time is smaller than that of the other speakers, so as to be lower in brightness than in the initial state. Alternatively, the conversation support apparatus 1, 1A, 1B, or 1D may control the display area or the character presentation image of the speaker, of which the detected uttering frequency or the detected uttering time is greater than that of the other speakers, so as to be higher in brightness than in the initial state. Accordingly, a user can recognize its own uttering frequency or uttering time. Alternatively, a host may effectively use the conversation support apparatus for conference progress or the like by checking this display and promoting a speaker having a low uttering frequency or a short uttering time to utter speech.

The first to fourth embodiments describe the example where the conversation support apparatus 1, 1A, 1B, or 1D includes the speech recognizing unit 13 or 13A, but the speech recognizing unit 13 or 13A may be provided, for example, via a network.

The above-mentioned processes may be performed by recording a program for performing the functions of the conversation support apparatus 1, 1A, 1B, or 1D according to the invention on a computer-readable recording medium and reading and executing the program recorded on the recording medium into a computer system. Here, the "computer system" may include an OS or hardware such as peripherals. The "computer system" may include a WWW system including a homepage providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that temporarily holds a program for a predetermined time, like a volatile memory (RAM) a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) like the Internet or a communication circuit (communication line) like a telephone line. The program may be configured to realize a part of the above-mentioned functions or may be configured to realize the above-mentioned functions by combination with a program recorded in advance in a computer system, like a so-called differential file (differential program).

What is claimed is:

1. A single conversation support apparatus which is formed into a plate shape comprises:
   two or more microphones configured to input speech signals of two or more users;
   a processor configured to recognize the inputted speech signals from the two or more microphones, wherein the processor is configured to convert the inputted speech signals into recognition results; and
   one display unit configured to display the recognition results of the processor, wherein the two or more microphones are disposed separately from each other in a same plane as the single conversation support apparatus, wherein the two or more microphones and the display unit are included within the single conversation support apparatus;
   wherein the processor is configured to:
   divide a display area of the one display unit to respectively correspond to the users;
   estimate sound source directions of the users based on signal levels of the inputted speech signals by the two or more microphones; and
   display the recognition results of the processor to be listed in time-series in the divided display areas, which respectively correspond to the users, of the one display unit at display angles respectively facing front when viewed from the estimated sound source directions, wherein the recognition results in each of the divided display areas are aligned in accordance with the estimated sound source directions so as to face at least one of the users.

2. The single conversation support apparatus according to claim 1, wherein the display of the recognition results in the divided display areas of the one display unit, which respectively correspond to the users, is based on the estimated sound source directions.

3. The single conversation support apparatus according to claim 1, further comprising a sound source separating unit configured to separate the speech signals input from the speech input unit by the users,
   wherein the display of the recognition results of the speech signals of the users other than one of the users corresponding to one of the divided display areas, out of the speech signals by the users separated by the sound source separating unit, in the one divided display area.

4. The single conversation support apparatus according to claim 1, further comprising a position estimating unit configured to estimate positions of the users,
   wherein the divided display areas are reset or rearranged respectively corresponding to the users at positions respectively corresponding to the positions of the users estimated by the position estimating unit.

5. The single conversation support apparatus according to claim 4, wherein the position estimating unit estimates the positions of the users using the speech signals input from the two or more microphones.

6. The single conversation support apparatus according to claim 1, further comprising a translation unit configured to translate the recognition results of the speech recognizing unit,
wherein the translation results of the translation unit is displayed in the divided display areas, which respectively correspond to the users, of the one display unit.

7. The single conversation support apparatus according to claim 6, further comprising a language information detecting unit configured to detect languages uttered by the users,
wherein the translation unit translates the recognition results of the speech signals of the users other than one of the users corresponding to one of the divided display areas into the language of the one user detected by the language information detecting unit.

8. The single conversation support apparatus according to claim 1, further comprising a communication unit configured to communicate with another conversation support apparatus,
wherein the two or more microphones input a speech signal received by the communication unit from the another conversation support apparatus, and
wherein the processor recognizes a speech signal of an user other than the users corresponding to the divided display areas out of the speech signals input from the speech input unit.

9. The single conversation support apparatus according to claim 8, further comprising an input unit configured to select a part of an image displayed on the one display unit,
wherein the image processing unit displays other recognition candidates corresponding to the selected part of the image on the one display unit when the part of the image selected by the input unit is the recognition result displayed on the one display unit, corrects the recognition result to the recognition candidate selected by the input unit out of the recognition candidates, and transmits the corrected recognition result to the another conversation support apparatus through the use of the communication unit.

10. A control method of a single conversation support apparatus which is formed into a plate shape, comprising:
inputting speech signals of two or more users at two or more microphones;
recognizing the inputted speech signals at a processor, and converting the inputted speech signals into recognition results;
dividing one display area of a display unit to respectively correspond to the users, wherein the one display unit is configured to display the recognition results of the processor, wherein the two or more microphones and the display unit are included within the single conversation support apparatus;
estimating a sound source direction of the users based on signal levels of the inputted speech signals by the two or more microphones; and
displaying the recognition results of the processor to be listed in time-series in the divided display area, which respectively correspond to the users, of the one display unit at display angles respectively facing front when viewed from the estimated sound source directions, wherein the two or more microphones are disposed separately from each other in a same plane as the single conversation support apparatus, wherein the recognition results in each of the divided display areas are aligned in accordance with the estimated sound source directions so as to face at least one of the users.

11. A non-transitory computer-readable medium encoding instructions that, when executed in hardware, perform a process, the process comprising:
inputting speech signals of two or more users at two or more microphones;
recognizing the inputted speech signals at a processor, and converting the inputted speech signals into recognition results;
dividing one display area of a display unit to respectively correspond to the users, wherein the one display unit is configured to display the recognized speech signals of the processor, wherein the two or more microphones and the display unit are included within a single conversation support apparatus;
estimating a sound source direction of the users based on signal levels of the inputted speech signals by the two or more microphones; and
displaying the recognized speech signals of the processor are listed in time-series in the divided display area, which respectively correspond to the users, of the display unit at display angles respectively facing front when viewed from the estimated sound source directions, wherein the two or more microphones are disposed separately from each other in a same plane as the single conversation support apparatus, wherein the recognition results in each of the divided display areas are aligned in accordance with the estimated sound source directions so as to face at least one of the users.

* * * * *